US011039067B2

(12) United States Patent
Kamiya et al.

(10) Patent No.: US 11,039,067 B2
(45) Date of Patent: Jun. 15, 2021

(54) IMAGE PICKUP APPARATUS, VIDEO SIGNAL PROCESSING APPARATUS, AND VIDEO SIGNAL PROCESSING METHOD

(71) Applicant: SONY CORPORATION, Tokyo (JP)

(72) Inventors: Koji Kamiya, Kanagawa (JP);
Yukihiro Kinoshita, Tokyo (JP);
Yasutaka Nakashima, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 28 days.

(21) Appl. No.: 16/486,343

(22) PCT Filed: Mar. 6, 2018

(86) PCT No.: PCT/JP2018/008601
§ 371 (c)(1),
(2) Date: Aug. 15, 2019

(87) PCT Pub. No.: WO2018/168578
PCT Pub. Date: Sep. 20, 2018

(65) Prior Publication Data
US 2019/0394395 A1 Dec. 26, 2019

(30) Foreign Application Priority Data
Mar. 15, 2017 (JP) .............................. JP2017-050621

(51) Int. Cl.
*H04N 5/232* (2006.01)
(52) U.S. Cl.
CPC ..... *H04N 5/23235* (2013.01); *H04N 5/23293* (2013.01)
(58) Field of Classification Search
CPC ......... H04N 5/23212; H04N 5/232127; H04N 5/23293; H04N 5/23296
(Continued)

(56) References Cited

U.S. PATENT DOCUMENTS

2003/0020819 A1   1/2003  Fukuda
2005/0093886 A1*  5/2005  Kubota ............... H04N 1/3872
                                                    345/619
(Continued)

FOREIGN PATENT DOCUMENTS

CN    104159021 A   11/2014
CN    106060377 A   10/2016
(Continued)

OTHER PUBLICATIONS

Extended European Search Report of EP Application No. 187683495, dated Feb. 11, 2020, 08 pages.
(Continued)

*Primary Examiner* — Anthony J Daniels
(74) *Attorney, Agent, or Firm* — Chip Law Group

(57) ABSTRACT

This image pickup apparatus includes: an image pickup unit including an image pickup element; a first video signal processing unit that generates a first video signal having a first resolution from a pixel signal obtained by the image pickup unit; a second video signal processing unit that sets a plurality of divided areas for spatially segmenting the first video signal generated by the first video signal processing unit, cuts out the first video signal in a region smaller than a size of the corresponding divided area as a block from the first video signal in each of the individual divided areas, and connects them to one another, to thereby generate a second video signal having a second resolution lower than the first resolution; and a view finder that displays the second video signal.

17 Claims, 18 Drawing Sheets

(58) Field of Classification Search
USPC .......................................... 348/333.02, 345
See application file for complete search history.

(56) References Cited

U.S. PATENT DOCUMENTS

| | | | |
|---|---|---|---|
| 2005/0128333 | A1 | 6/2005 | Park et al. |
| 2010/0214445 | A1* | 8/2010 | Chronqvist ........ H04N 5/23216 |
| | | | 348/231.99 |
| 2011/0149125 | A1 | 6/2011 | Morimoto |
| 2014/0119675 | A1* | 5/2014 | Kim .......................... G06T 3/40 |
| | | | 382/299 |
| 2014/0333790 | A1 | 11/2014 | Wakazono |
| 2016/0295103 | A1* | 10/2016 | Ishii .................. H04N 5/36961 |
| 2016/0295120 | A1 | 10/2016 | Ota et al. |

FOREIGN PATENT DOCUMENTS

| | | |
|---|---|---|
| EP | 1282304 A1 | 2/2003 |
| JP | 2007-259104 A | 10/2007 |
| JP | 2007-336257 A | 12/2007 |
| JP | 4658401 B2 | 3/2011 |
| JP | 2011-135170 A | 7/2011 |
| JP | 5490514 B2 | 5/2014 |
| JP | 2014-222801 A | 11/2014 |
| JP | 2016-066838 A | 4/2016 |
| JP | 2016-197819 A | 11/2016 |
| KR | 10-2005-0059639 A | 6/2005 |
| KR | 10-2011-0073159 A | 6/2011 |
| KR | 10-2016-0118969 A | 10/2016 |

OTHER PUBLICATIONS

International Search Report and Written Opinion of PCT Application No. PCT/JP2018/008601, dated Apr. 24, 2018, 08 pages of ISRWO.
Office Action for CN Patent Application No. 2018800163293, dated Oct. 23, 2020, 11 pages of English Translation and 08 pages of Office Action.

* cited by examiner

FIG.16

IMAGE PICKUP APPARATUS, VIDEO SIGNAL PROCESSING APPARATUS, AND VIDEO SIGNAL PROCESSING METHOD

CROSS REFERENCE TO RELATED APPLICATIONS

This application is a U.S. National Phase of International Patent Application No. PCT/JP2018/008601 filed on Mar. 6, 2018, which claims priority benefit of Japanese Patent Application No. JP 2017-050621 filed in the Japan Patent Office on Mar. 15, 2017. Each of the above-referenced applications is hereby incorporated herein by reference in its entirety.

TECHNICAL FIELD

The present technology relates to an image pickup apparatus such as a video camera and a video signal processing apparatus and a video signal processing method to be used for the image pickup apparatus or the like.

BACKGROUND ART

An image pickup pixel number of a video camera has been increasing. In recent years, there are also many cameras having an image pickup pixel number of 4K (3840× 2160). When the image pickup pixel number of the video camera increases in this manner, the high accuracy is required for focus adjustment. In view of this, there is a technology of achieving an improvement in the accuracy of user's focus adjustment by enlarging part of captured video and displaying it on a view finder (see Patent Literature 1).

CITATION LIST

Patent Literature

Patent Literature 1: Japanese Patent Application Laid-open No. 2007-336257

DISCLOSURE OF INVENTION

Technical Problem

However, the focus adjustment while the user is viewing local video displayed on the view finder has a practically insufficient point and it is desirable to solve it.

An object of the present technology relates to an image pickup apparatus, a video signal processing apparatus, and a video signal processing method, which enable focus adjustment while visually recognizing display video on a view finder to be favorably performed.

Solution to Problem

In order to solve the above-mentioned problem, which is a first embodiment the image pickup apparatus according to the present technology includes:
an image pickup unit including an image pickup element;
a first video signal processing unit that generates a first video signal having a first resolution from a pixel signal obtained by the image pickup unit;
a second video signal processing unit that sets a plurality of divided areas for spatially segmenting the first video signal generated by the first video signal processing unit, cuts out the first video signal in a region smaller than a size of the corresponding divided area as a block from the first video signal in each of the individual divided areas, and connects them to one another, to thereby generate a second video signal having a second resolution lower than the first resolution; and
a view finder that displays the second video signal.

The size of the divided area includes 3 horizontal×3 vertical pixels or more and the size of the block includes either 2 horizontal×1 vertical pixels or more or 1 horizontal×2 vertical pixels or more.

The second video signal processing unit may be configured to segment the first video signal into one or more divided areas having a first size and a plurality of divided areas having a second size smaller than the first size.

The second video signal processing unit may be configured to arrange the one or more divided areas having the first size at a center portion of a video space according to the first video signal and arrange the plurality of divided areas having the second size at a periphery of the one or more divided areas having the first size.

The second video signal processing unit may be configured to set the individual block at such a position that the individual blocks is present over the plurality of divided areas.

The image pickup apparatus may further include a control unit that controls the second video signal processing unit to respectively move a position of the block in each of the divided areas in accordance with a switching instruction provided by a user.

The second video signal processing unit may further include a downconverter that generates a third video signal having the second resolution from the first video signal by downconversion, and a switching unit that switches between the second video signal and the third video signal.

The second video signal processing unit may include a detail processing unit that performs processing of emphasizing an outline of the second video signal and skipping a joint between the blocks.

An image pickup apparatus which is a second embodiment according to the present technology includes:
an image pickup unit including an image pickup element;
a first video signal processing unit that generates a first video signal having a first resolution from a pixel signal obtained by the image pickup unit;
a second video signal processing unit that generates a downconverted video by downconverting the first video signal in an outer edge portion, sets a plurality of divided areas for spatially segmenting the first video signal in a region inside the outer edge portion, cuts out the first video signal in a region smaller than a size of the corresponding divided area as a block from the first video signal in each of the individual divided areas, and connects the blocks to one another to thereby generate block-connected video, and connects the downconverted video and the block-connected video to each other to thereby generate a second video signal having a second resolution lower than the first resolution; and
a view finder that displays the second video signal.

A video signal processing apparatus according to a third embodiment of the present technology includes:
a first video signal processing unit that generates a first video signal having a first resolution from a pixel signal obtained by an image pickup apparatus; and
a second video signal processing unit that sets a plurality of divided areas for spatially segmenting the first video signal generated by the first video signal processing unit, cuts out the first video signal in a region smaller than a size of the corresponding divided area as a block from the first video signal in each of the individual divided areas, and connects the blocks to one another to thereby generate a second video signal having a second resolution lower than the first resolution.

A video signal processing method according to the present technology includes:

generating, by a first video signal processing unit, a first video signal having a first resolution from a pixel signal obtained by an image pickup apparatus; and setting, by a second video signal processing unit, a plurality of divided areas for spatially segmenting the first video signal, cutting out the first video signal in a region smaller than a size of the corresponding divided area as a block from the first video signal in each of the individual divided areas, and connecting the blocks to one another to thereby generate a second video signal having a second resolution lower than the first resolution.

Advantageous Effects of Invention

As described above, in accordance with the present technology, it is possible to favorably perform focus adjustment while viewing display video on a view finder.

BRIEF DESCRIPTION OF DRAWINGS

FIG. 16 A diagram showing an operation method in a case of changing an operation element on the UI screen shown in FIG. 14.

MODE(S) FOR CARRYING OUT THE INVENTION

Hereinafter, embodiments according to the present technology will be described with reference to the drawings.

First Embodiment

Figure 1:
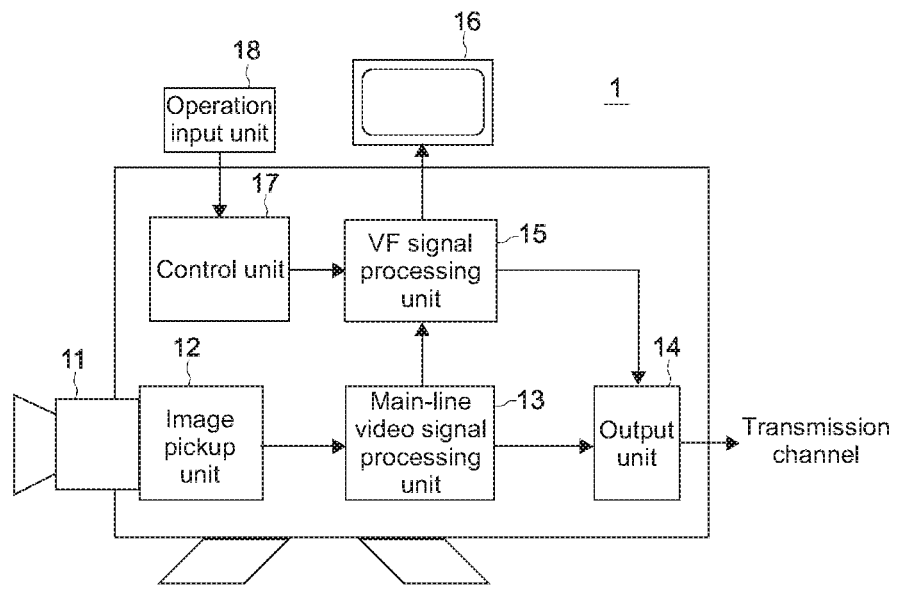
FIG. 1 A block diagram showing a configuration of an image pickup apparatus of a first embodiment according to the present technology.

FIG. 1 is a block diagram showing a configuration of an image pickup apparatus of a first embodiment according to the present technology.

This image pickup apparatus 1 includes an optical block 11, an image pickup unit 12, a main-line video signal processing unit 13, an output unit 14, a VF signal processing unit 15, a view finder (VF) 16, a control unit 17, and an operation input unit 18.

The optical block 11 includes a lens, a focus adjustment mechanism, a shutter mechanism, a diaphragm (iris) mechanism, and the like. The optical block 11 images reflection light from an object to be imaged on an imaging plane of an image pickup element of the image pickup unit 12 through a lens.

The image pickup unit 12 includes an image pickup element, an analog signal processing circuit, an A/D conversion circuit, and the like. The image pickup element includes a charge coupled device (CCD) image sensor, a complementary metal oxide semiconductor (CMOS) image sensor, and the like. The image pickup element includes, for example, 4K (3840×2160), 8K (7680×4320), and the like, and has a relatively large effective pixel number. A pixel signal obtained by the image pickup element of the image pickup unit 12 is supplied to the main-line video signal processing unit 13.

The main-line video signal processing unit 13 corresponds to the "first video signal processing unit" in the scope of claims and generates a first video signal having a first resolution corresponding to an effective pixel number of the image pickup element by performing signal processing such as defect correction, noise cancel, lens aberration correction, A/D conversion, RAW phenomenon, and the like, for example, on the pixel signal supplied by the image pickup unit 12. The first video signal is a video signal having a relatively high resolution, for example, a 4K video signal, an 8K video signal, or the like. It should be noted that in the present specification, the description will be continued assuming a case where the 4K video signal is generated. The generated first video signal is supplied to the output unit 14 and the VF signal processing unit 15.

The output unit 14 performs processing of outputting the first video signal obtained by the main-line video signal processing unit 13 to a video device or a display outside a camera control unit (CCU) and the like through a camera cable. In the CCU, processing or the like of receiving the first video signal and the like transmitted through a camera cable 30 from the image pickup apparatus 1, converting it into a digital video signal or an analog video signal in format suitable for transmission, for example, and transmitting it is performed.

It should be noted that the first video signal obtained by the main-line video signal processing unit 13 may be recorded on a recording medium such as a solid state drive (SSD).

The VF signal processing unit 15 corresponds to the "second video signal processing unit" in the scope of claims and generates a second video signal having a second resolution which is a screen resolution of the VF 16 from the first video signal having the first resolution which is obtained by the main-line video signal processing unit 13.

The VF 16 includes a screen on which the second video signal can be displayed.

The operation input unit 18 receives inputs of instructions, various settings, and the like for operating the image pickup apparatus 1 from the user and includes a button, a switch, a dial, a touch panel sensor provided in the screen of the VF 16, and the like, for example.

The control unit 17 is a controller for controlling the respective units of the image pickup apparatus 1 and includes a central processing unit (CPU), a random access memory (RAM), and a read only member (ROM), and the like. Programs, various parameters and the like to be executed by the CPU are stored in the RAM or the ROM. The control unit 17 interprets information of an operation input of the user which is received in the operation input unit 18 and controls the image pickup apparatus 1 in accordance with the interpreted input information.

Next, details of the above-mentioned VF signal processing unit 15 will be described.

Figure 2:
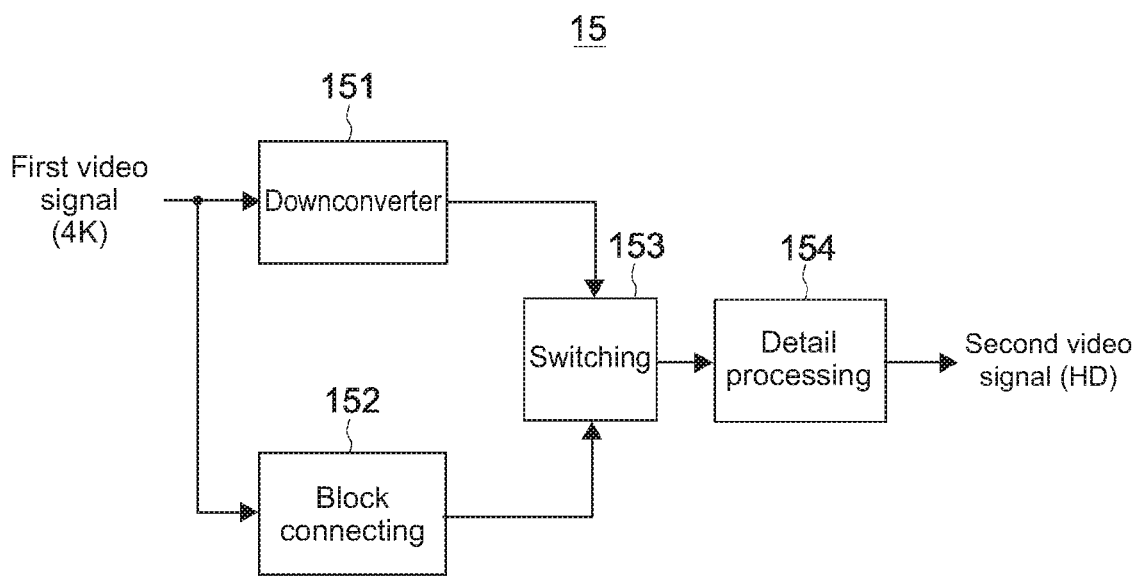
FIG. 2 A block diagram showing a functional configuration of a VF signal processing unit 15 in the image pickup apparatus 1 of FIG. 1.

FIG. 2 is a block diagram showing a functional configuration of the VF signal processing unit 15.

The VF signal processing unit 15 includes a downconverter 151, a block connecting unit 152, a switching unit 153, and a detail processing unit 154.

The downconverter 151 converts an input first video signal into a second video signal having a resolution which is the screen resolution of the VF 16 by typical resolution conversion. More specifically, the downconverter 151 converts the first video signal having the 4K resolution into the second video signal having the HD resolution by downconversion. A typical method of downconverting the first video signal having the 4K resolution into the second video signal having the HD resolution includes, for example, a method of converting an average value of 2 vertical×2 horizontal pixels of the first video signal into a value of 1 pixel of the second video signal and the like.

The block connecting unit 152 sets a plurality of divided areas for spatially segmenting the input first video signal and cuts out the first video signal in a region smaller than a size of the corresponding divided area as a block from the first video signal in each of the individual divided areas, and connects the blocks to one another to thereby generate a second video signal having the second resolution.

In accordance with a selection instruction provided from the user by using the operation input unit 18, the switching unit 153 selects one of the second video signal which is the output of the downconverter 151 and the second video signal which is the output of the block connecting unit 152 and supplies the selected one to the detail processing unit 154.

The detail processing unit 154 performs detail processing of emphasizing a contour of the object to be imaged with respect to the second video signal selected by the switching unit 153 and outputs the result to the VF 16.

In this VF signal processing unit 15, the second video signal to be supplied to the VF 16 can be switched to the second video signal obtained by the downconverter 151 and the second video signal obtained by the block connecting unit 152 in accordance with a selection instruction provided from the user by using the operation input unit 18.

It should be noted that in the above-mentioned configuration of the image pickup apparatus 1, the main-line video signal processing unit 13 and the VF signal processing unit 15 correspond to a "video signal processing apparatus" according to the present technology in the scope of claims.

(Generation of VF Video Signal)

Figure 3:
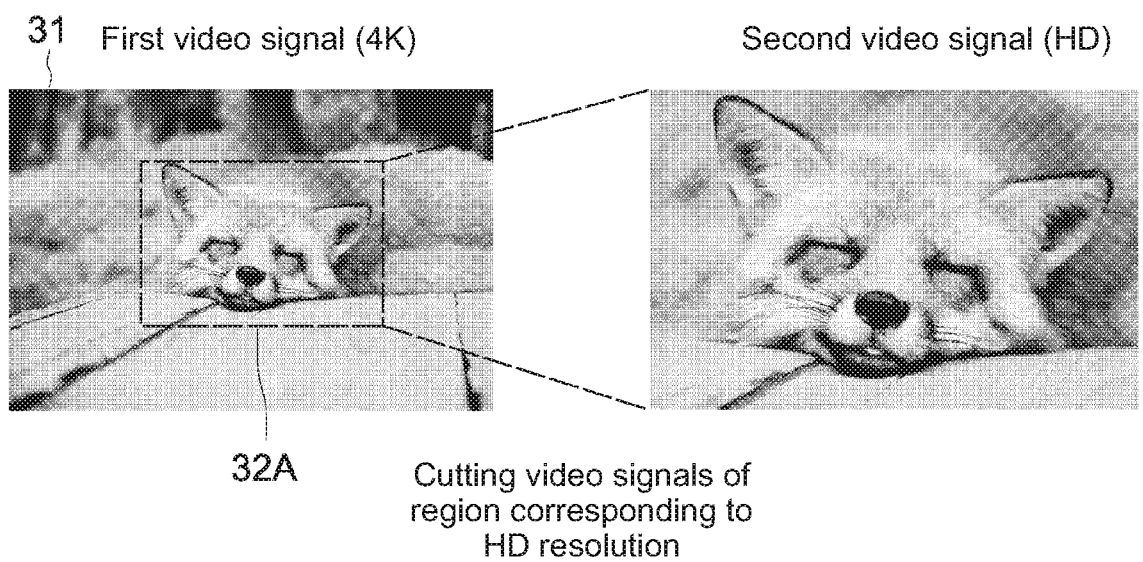
FIG. 3 A diagram showing a typical method of generating an HD second video signal to be displayed on a VF from a 4K first video signal.

A typical method of generating the second video signal having the HD resolution to be used as the VF video signal on the basis of the first video signal having the 4K resolution includes, for example, a method of cutting out a video signal in a region 32A corresponding to the HD resolution from the first video signal 31 having the 4K resolution and displaying it as a second video signal 33 on the screen of the VF 16, as shown in FIG. 3. It should be noted that although video of the first video signal 31 having the 4K resolution and video of the second video signal 33 having the HD resolution are shown in FIG. 3 with the same size, the size of the video of the second video signal 33 is actually ½ of the size of the video of the first video signal 31 having the 4K resolution in both of vertical and horizontal directions.

Figure 4:
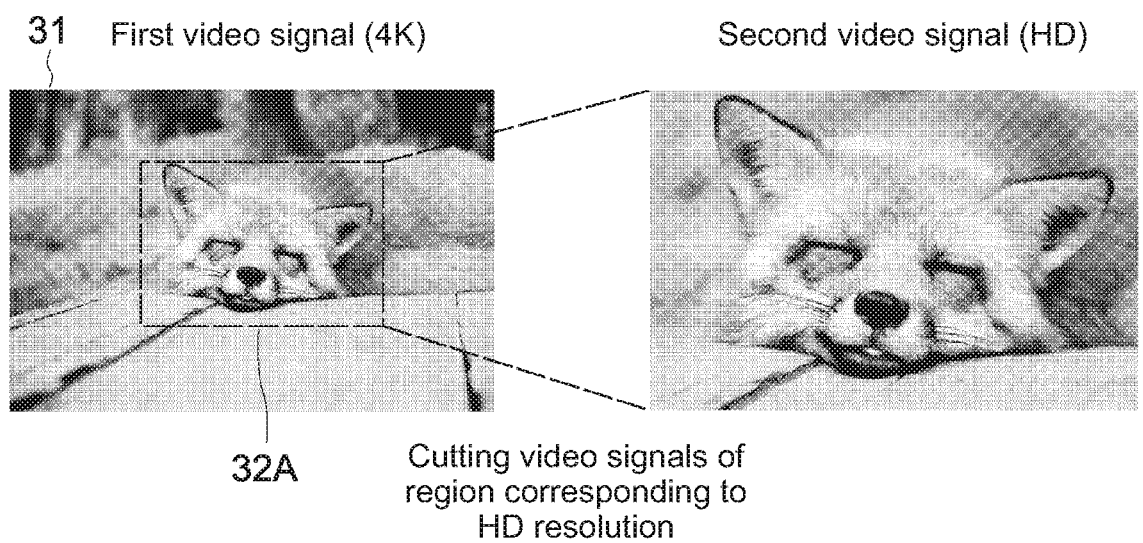
FIG. 4 A diagram showing movement of a region corresponding to an HD resolution to be cut out from the 4K first video signal.

However, a position on which a cameraman (user) tries to adjust focus in a frame is not constant, and thus it is necessary to move the region corresponding to the HD resolution to be cut out from the first video signal 31 having the 4K resolution from a position of the region 32A to a position of a region 32B as shown in FIG. 4 and complicated user's operations therefor are required.

In view of this, in this embodiment, the block connecting unit 152 in the VF signal processing unit 15 sets a plurality of divided areas for spatially segmenting the input first video signal having the first resolution (e.g., 4K), cuts out the first video signal in a region smaller than a size of the corresponding divided area as a block from the first video signal in each of the individual divided areas, and connects the blocks to one another to thereby generate a second video signal having the second resolution (e.g., HD).

The size of the divided area theoretically needs to be 3 horizontal×3 vertical pixels or more and the size of the block theoretically needs to be 2 horizontal×1 vertical pixels or more or 1 horizontal×2 vertical pixels or more. It is because the contrast between two pixels adjacent to each other in the first video signal is an index for visually recognizing the focus state.

It should be noted that when the size of the divided area, block is made too small, it is difficult to visually recognize the focus state, and thus 2 to 20 in both of the horizontal and vertical directions, for example, are practically suitable as the number of divided areas. The number of divided areas does not necessarily need to be the same in the horizontal and vertical directions.

Further, the first resolution may be a resolution of 4K, 8K, or more.

In a case where the first resolution is 4K, the second resolution may be a resolution such as HD or less.

In a case where the first resolution is 8K, the second resolution may be a resolution such as 4K, HD, or less.

(Specific Description of VF Signal Generation by Block Connecting Unit 152)

Next, an operation of the block connecting unit 152 will be specifically described.

It should be noted that in this specific example, it is assumed that the resolution of the first video signal is 4K, the resolution of the second video signal is HD, the size of the divided area is 1280 horizontal×720 vertical pixels, and the size of the block is 640 horizontal×360 vertical pixels.

Figure 5:
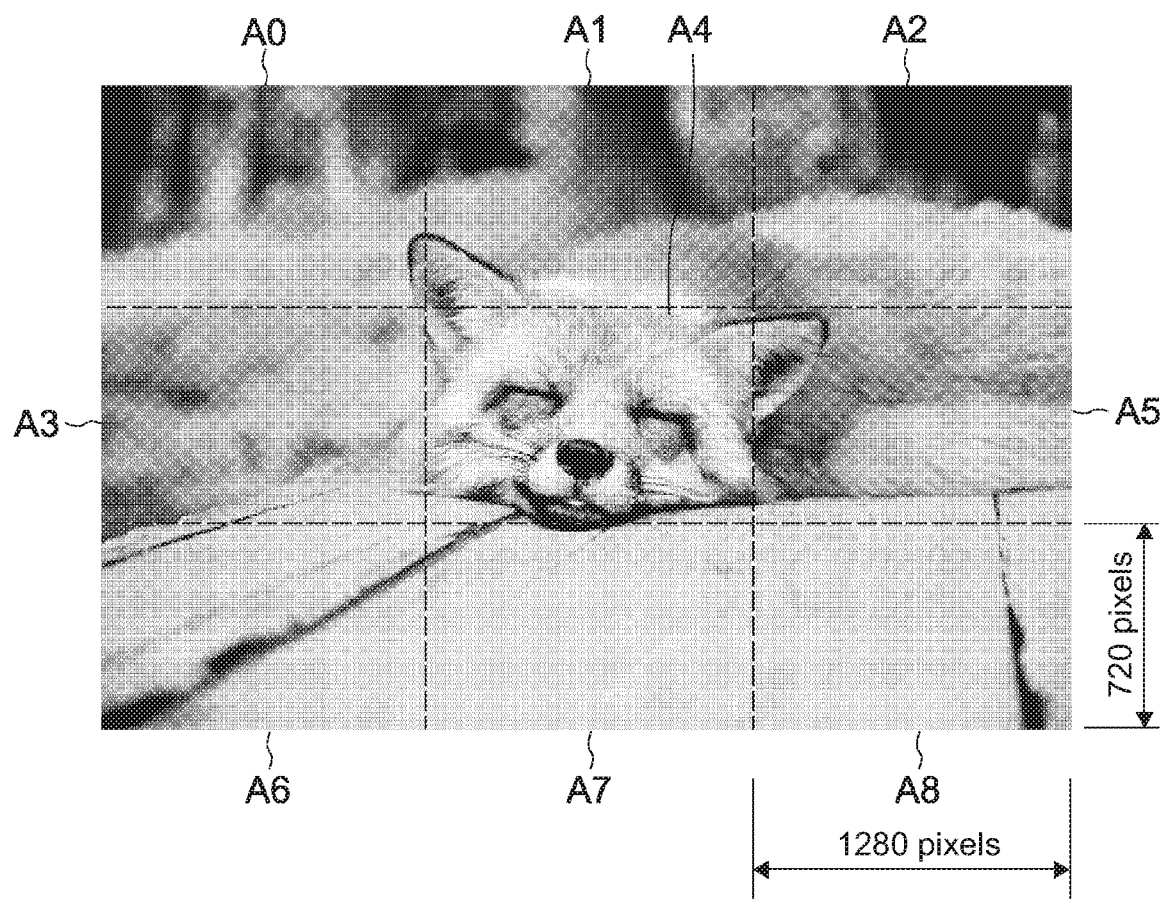
FIG. 5 A diagram showing a setting example of divided areas with respect to the 4K first resolution signal.

First of all, the block connecting unit 152 sets, as shown in FIG. 5, a total of 9 divided areas A0 to A8 of 3 horizontal×3 vertical areas for spatially segmenting the 4K first resolution signal 31. The size of the individual divided areas A0 to A8 is 1280 horizontal×720 vertical pixels.

Figure 6:
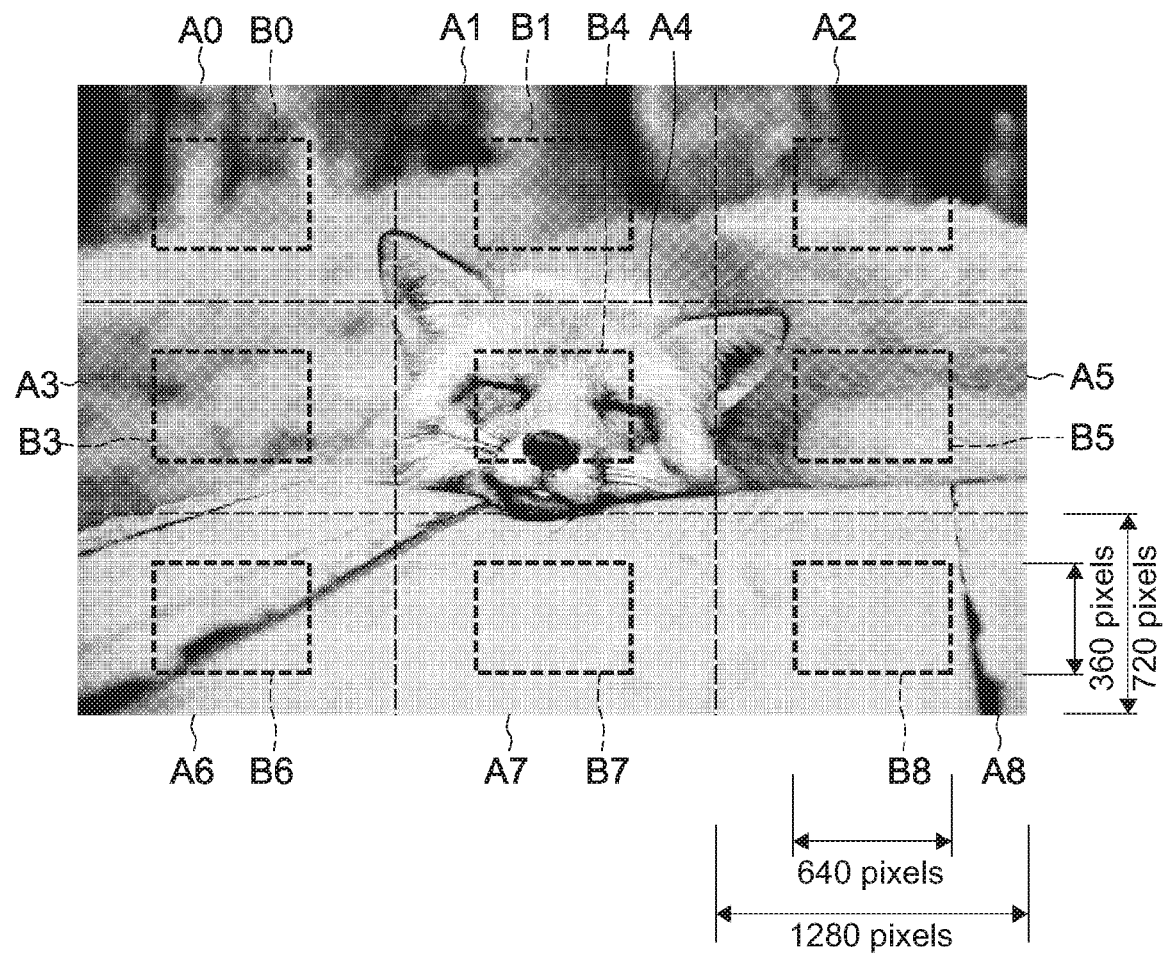
FIG. 6 A diagram showing a setting example of blocks in the divided areas.

Next, the block connecting unit 152 cuts out a group of 640 horizontal×360 vertical pixels as the blocks B0 to B8 from the first video signal 31 for each of the individual divided areas A0 to A8 as shown in FIG. 6. In this example, a case where the positions of the blocks B0 to B8 to be cut out from the respective divided areas A0 to A8 are rectangular regions of 640 horizontal×360 horizontal pixels corresponding to the center portion of the respectively corresponding divided areas A0 to A8 is assumed.

It should be noted that the positions of the blocks B0 to B8 to be cut out from the divided areas A0 to A8 may be other than the center portion. Further, the sizes and positions of the blocks B0 to B8 to be cut out form the respective divided areas A0 to A8 may be identical among the respective divided areas A0 to A8 or does not need to be identical.

Figure 7:
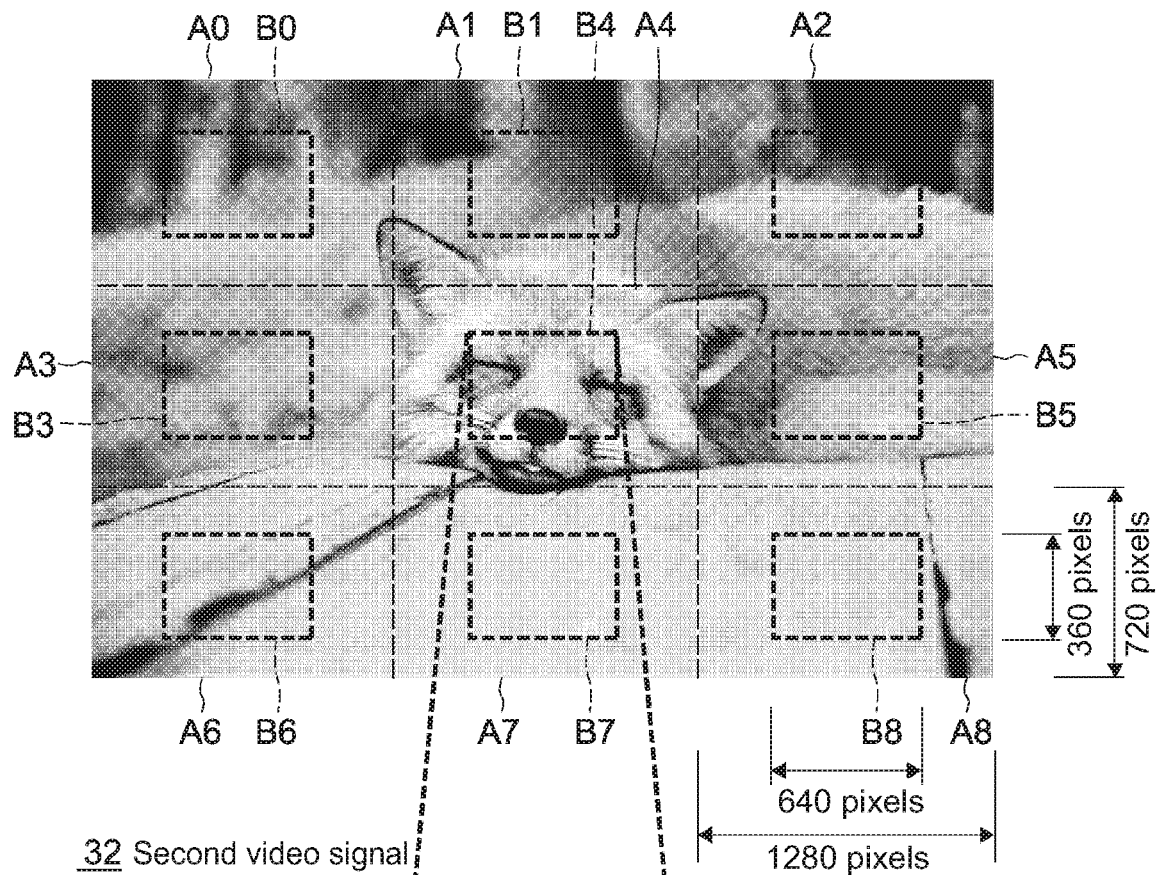
FIG. 7 A diagram showing an example of a second video signal generated by connecting the respective blocks to one another.
Figure 7:
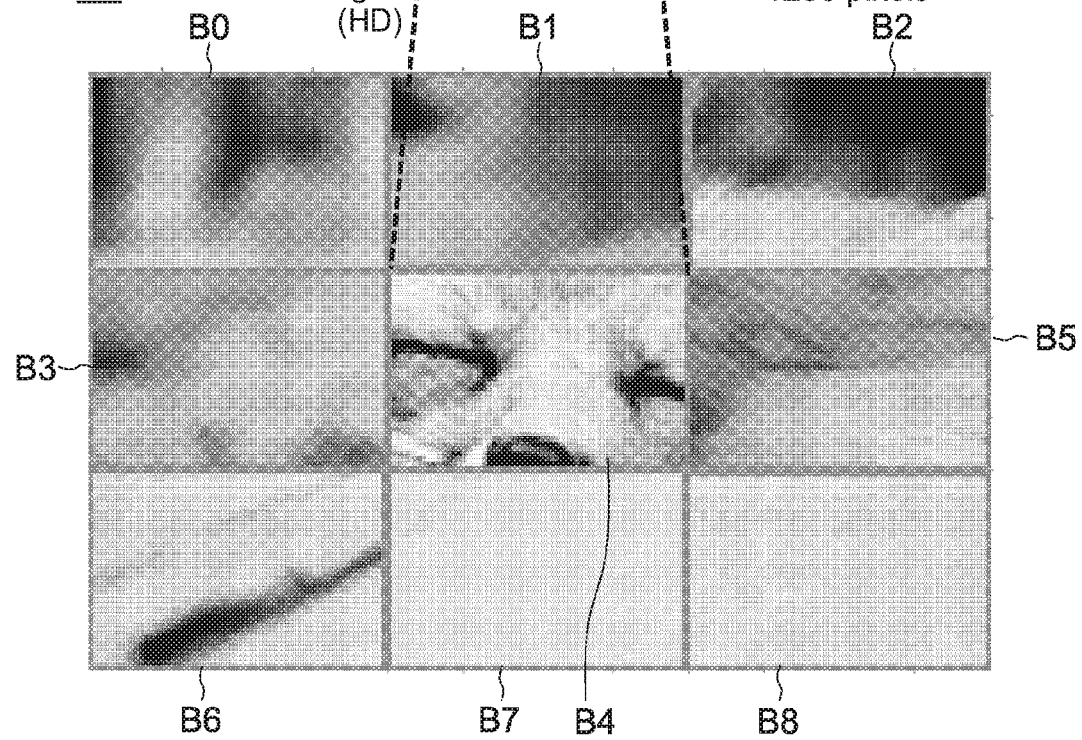

Next, as shown in FIG. 7, the block connecting unit 152 connects the respective blocks B0 to B8 respectively cut out from the respective divided areas A0 to A8 to one another correspondingly to a vertical and horizontal positional relationship between the respective divided areas A0 to A8 in the first video signal 31, to thereby generate a second video signal 34 having the HD resolution. Then, the VF signal processing unit 15 supplies the generated second video signal 34 as the VF video signal to the VF 16 and displays it on the screen of the VF 16.

As described above, in accordance with the image pickup apparatus 1 of this embodiment, the block connecting unit 152 of the VF signal processing unit 15 sets the plurality of divided areas for spatially segmenting the first video signal having the first resolution. The block connecting unit 152 of the VF signal processing unit 15 cuts out the first video signal in the region smaller than the size of the corresponding divided area as the block from the first video signal in each of the individual divided areas, and connects the blocks to one another to thereby generate the second video signal having the second resolution. The second video signal is displayed on the screen of the VF 16.

With this configuration, on the screen of the VF 16 having the screen resolution lower than the resolution of the first video signal, the VF video signal with which the focus state at the position of each divided area of the first video signal can be visually recognized is obtained. Therefore, without requiring an operation of moving the region of the first video signal to be displayed on the screen of the VF 16, the user can start an operation of focusing on an arbitrary divided area and can rapidly perform focus adjustment.

Next, modified examples according to the present technology will be described.

Modified Example 1

(Modified Example of VF Video Format)

Figure 8:
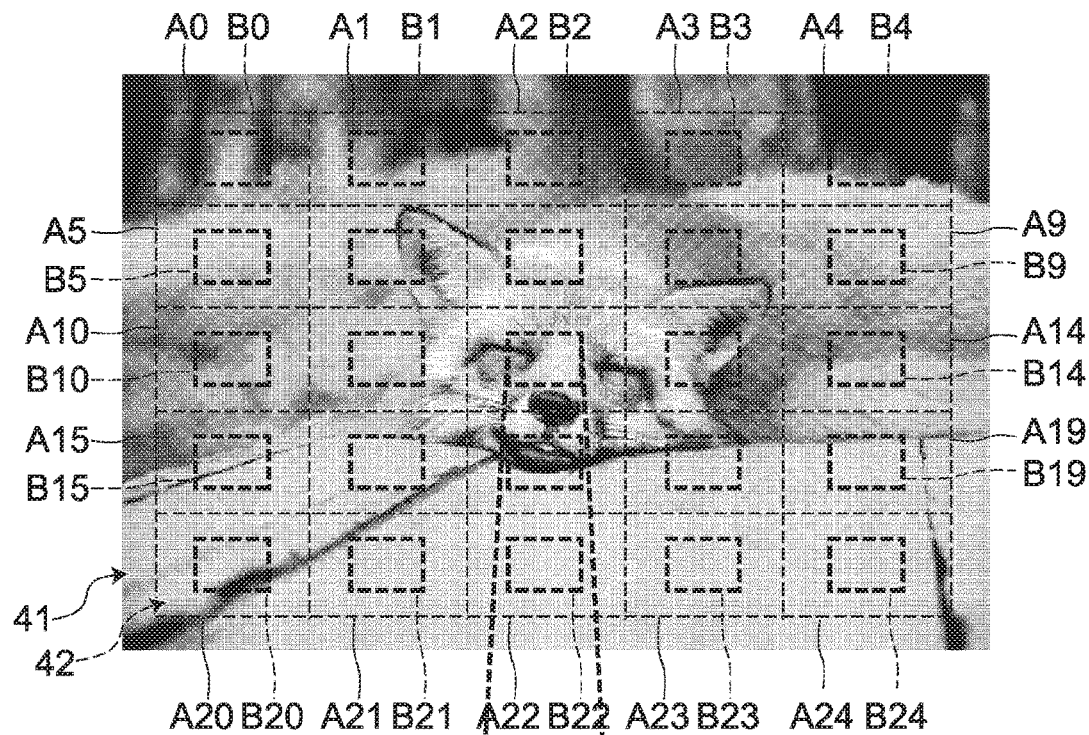
FIG. 8 A diagram showing a modified example of a VF video format.
Figure 8:
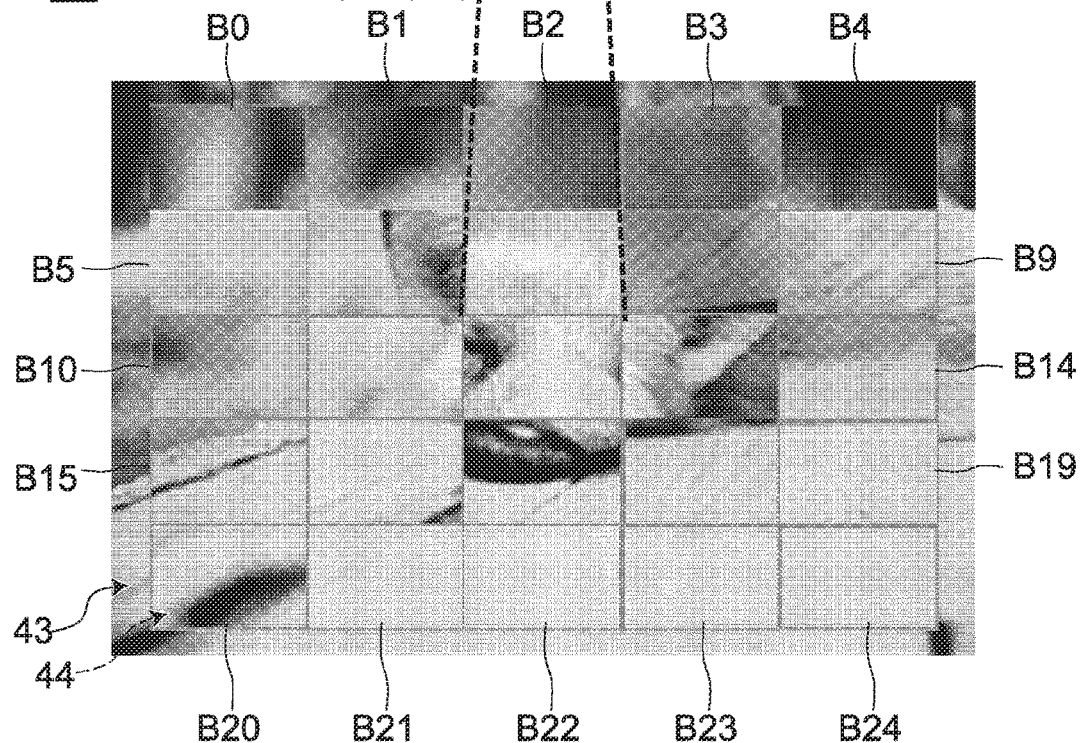

FIG. 8 is a diagram showing a modified example of a VF video format obtained by the VF signal processing unit 15.

In this modified example, the VF signal processing unit 15 divides the first video signal 31 having the first resolution (e.g., 4K) into an outer edge region 41 and an inner region 42. The downconverter 151 of the VF signal processing unit 15 downconverts the first video signal 31 of the outer edge region 41 to thereby generate downconverted video in the outer edge region 43 of the second video signal 34.

Further, the VF signal processing unit 15 sets, by the block connecting unit 152, a plurality of divided areas A0 to A24 for spatially segmenting the first video signal 31 in the inner region 42, cuts out the first video signal in the region smaller than the size of the corresponding divided areas A0 to A24 as blocks B0 to B24 from the first video signal 31 in the inner region 42 in each of individual divided areas A0 to A24 and connects the blocks B0 to B24 to one another to thereby generate block-connected video in an inner region 44 of the second video signal 34.

Then, the VF signal processing unit 15 connects the downconverted video in the outer edge region 43 which is obtained by the downconverter 151 and the block-connected video in the inner region 44 which is obtained by the block connecting unit 152 to generate a second video signal 34 having the second resolution (e.g., HD) and outputs the second video signal 34 to the VF 16.

As described above, the downconverted video obtained by downconverting the first video signal 31 of the outer edge region 41 is arranged at the outer edge region 43 of the second video signal 34, such that the focus state of each divided area of the first video signal can be visually recognized and a VF video with which an image pickup range of the object to be imaged can also be easily visually recognized is obtained.

Modified Example 2

(Divided Areas Having Two Sizes)

The sizes of the plurality of divided areas for spatially segmenting the first video signal do not need to be all the same. Further, the sizes of the blocks do not need to be all the same.

Figure 9:
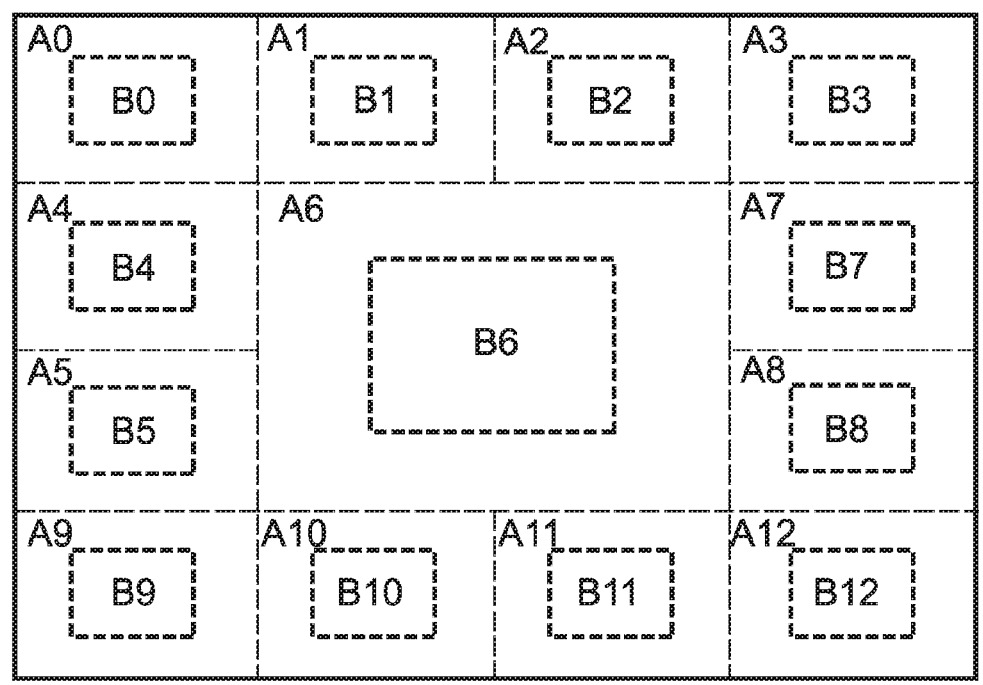
FIG. 9 A diagram showing a modified example of a format of the divided areas.

For example, as shown in FIG. 9, the size of the divided area A6 of a middle portion of the first video signal 31 may be made larger than the size of the plurality of divided areas (A0 to A5, A7 to A12) at the periphery and the size of the block B6 to be cut out from the divided area A6 of this middle portion may also be made larger than the size of the blocks (B to B5, B7 to B12) to be cut out from the respective divided areas (A0 to A5, A7 to A12) at the periphery.

The example of FIG. 9 is an example in which the size of the divided area A6 of the middle portion is set to be twice as large as the size of the divided areas (A0 to A5, A7 to A12) at the periphery in the horizontal and vertical directions and the size of the block to be cut from the divided area A6 of the middle portion is set to be twice as large as the size of the block to be cut out from the divided area at the periphery in the horizontal and vertical directions. With this configuration, the second video signal with a degree of attention of the video of the block B6 cut out from the divided area A6 of the center portion being increased can be obtained and a VF video signal favorable in a case where image pickup is frequently performed focusing on the center portion of the visual field of the image pickup apparatus 1 is obtained.

In addition, one or more divided areas, blocks having a large size may be set in a region other than the center portion of the first video signal, corresponding to a position of a region which is frequently selected for focusing.

Modified Example 3

(Position of Block to be Cut Out from Divided Area)

Figure 10:
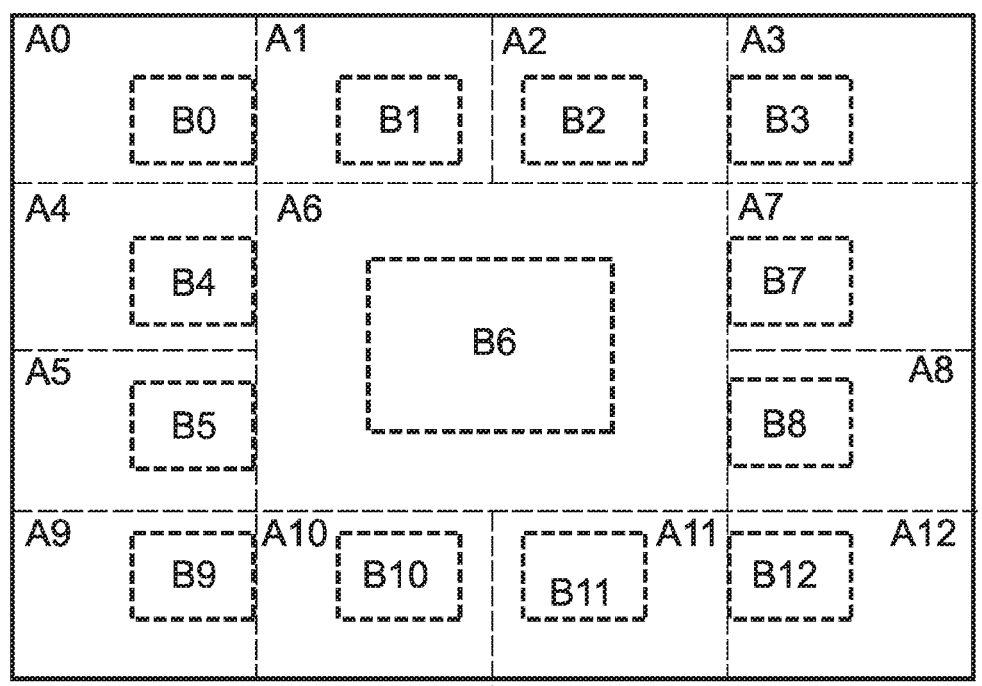
FIG. 10 A diagram showing a modified example of block positions in the respective individual divided areas.

The position of the block to be cut out from the divided area does not necessarily need to be the center portion of the divided area. For example, as shown in FIG. 10, the block may be set at a deviated position within the divided area. In the example of FIG. 10, the blocks (B0 to B5, B7 to B12) are set at deviated positions closer to the center divided area A6 with respect to the plurality of divided areas (A0 to A5, A7 to A12) at the peripheral portion. As a matter of course, with respect to the plurality of divided areas (A0 to A5, A7 to A12) at the peripheral portion, the blocks (B0 to B5, B7 to B12) may be set at positions deviated in a direction away from the center divided area A6.

Figure 11:
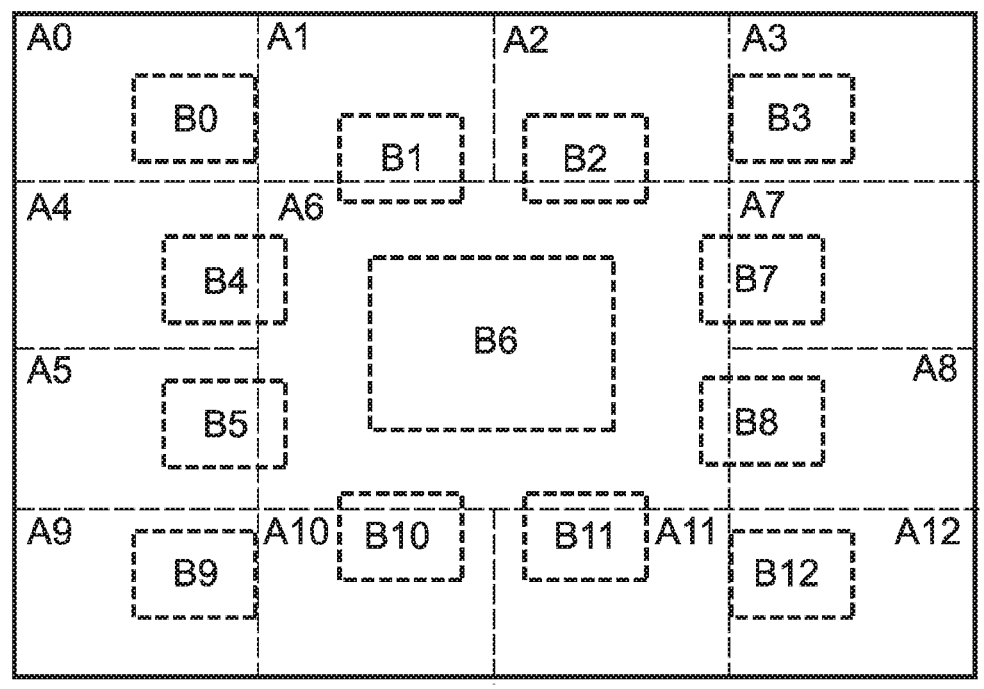
FIG. 11 A diagram showing another modified example of the block positions in the respective individual divided areas.

Further, as shown in FIG. 11, the block may be set to be present over a plurality of adjacent divided blocks. The example of FIG. 11 shows a case where the blocks (B1, B2, B4, B5, B7, B8, B10, B11) corresponding to the plurality of divided areas (A1, A2, A4, A5, A7, A8, A10, A11) adjacent to the center divided area A6 in upper and lower, left and right directions are set to partially enter the center divided area A6.

Modified Example 4

(Movement of Block Position within Divided Area)

The position of the block may be movable within the divided area.

In order to move the position of the block within the divided area, the control unit 17 performs control to move the position of the block within the divided area in real time in accordance with a switching instruction provided from the user by using the operation input unit 18.

Figure 12:
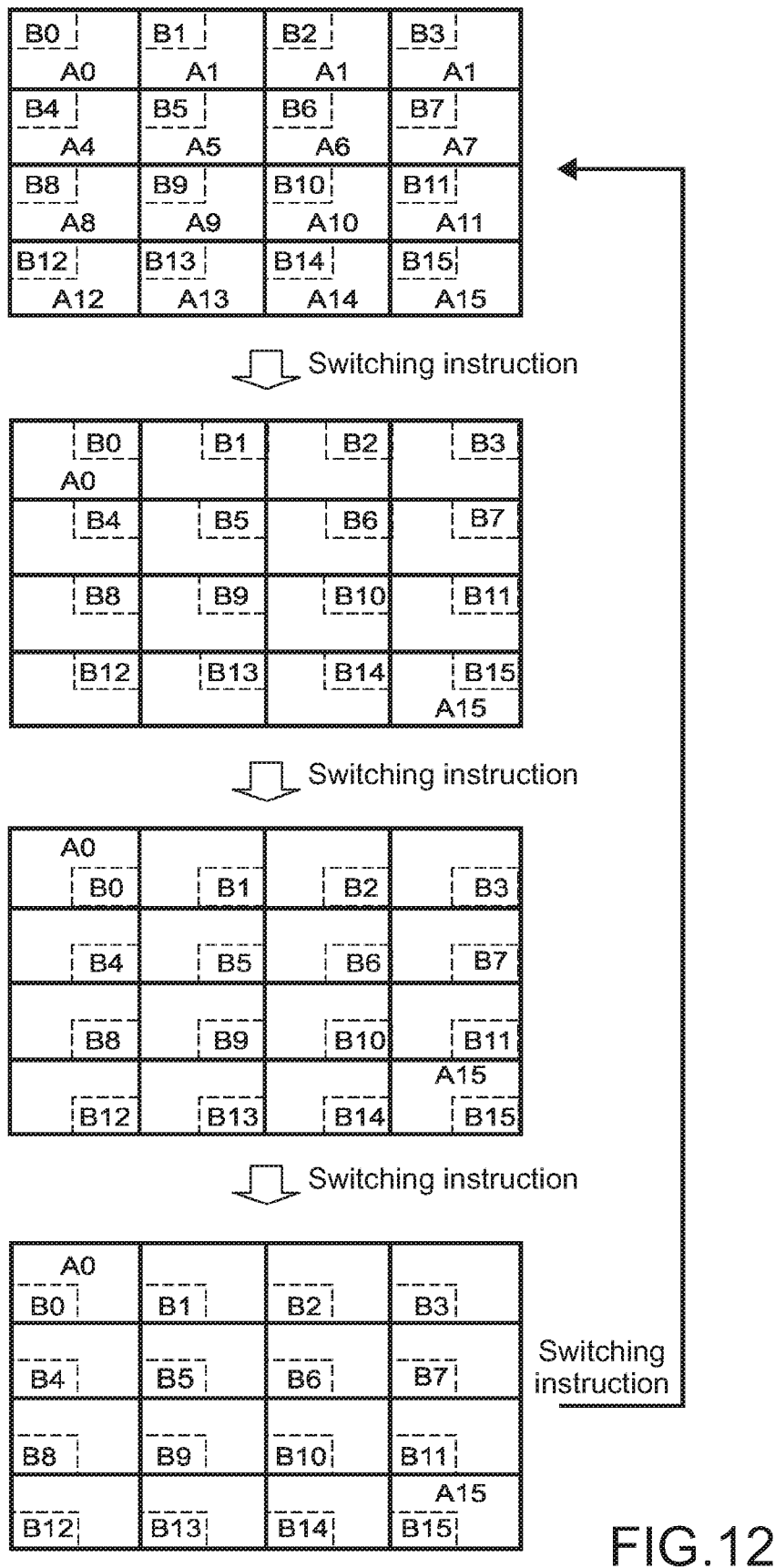
FIG. 12 A diagram showing movement control of the blocks in the divided areas.

FIG. 12 is a diagram showing an example of movement control of the block position.

In this example, the respective divided areas A0 to A15 are divided into a total of 4 equal regions of 2 vertical×2 horizontal and one of the regions becomes effective as the block B0 to B15. The control unit 17 performs control to move the blocks B0 to B15 within the respective divided areas A0 to A15 in the clockwise direction to next regions at the same time in accordance with a switching instruction provided from the user by using the operation input unit 18. In this example, the blocks B0 to B15 return to the original positions in one cycle by being provided with an instruction to switch 4 times.

Further, the movement direction of the block may be switchable between the clockwise direction and the counter-clockwise direction by user's setting.

Modified Example 5

(Cancel of Detail Processing)

Figure 13:
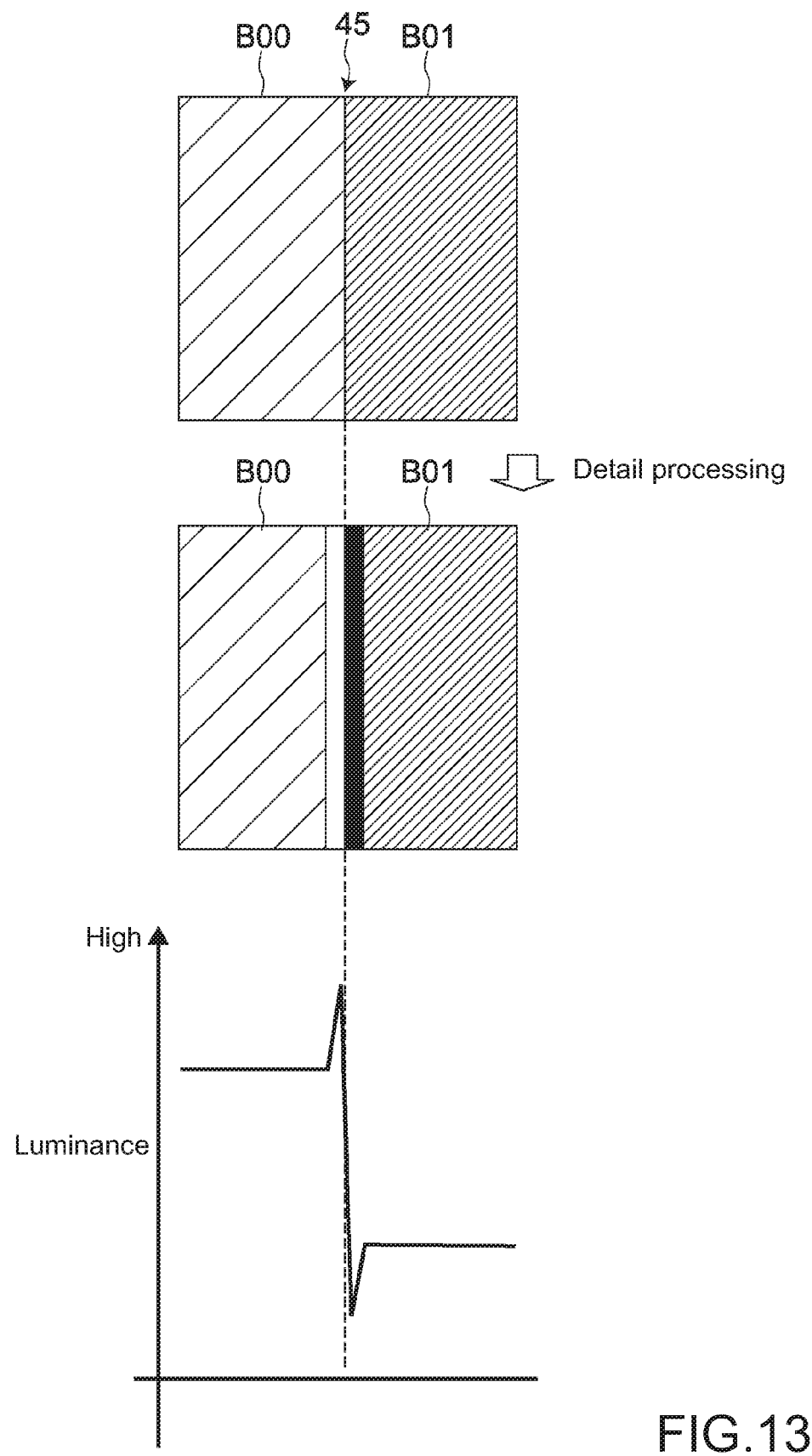
FIG. 13 A diagram describing detail processing.

In the above-mentioned embodiment, the detail processing unit 154 in the VF signal processing unit 15 performs detail processing of emphasizing the contour of the object to be imaged with respect to the second video signal. This detail processing is performed by determining a luminance change portion of the video as a contour. Therefore, as shown in FIG. 13, most part of a joint portion 45 between the blocks B00 and B01 is emphasized as the contour and the focus state can be an obstacle in visual recognition.

In view of this, the VF signal processing unit 15 is configured to invalidate the detail processing of the joint between the blocks on the basis of positional information of the joint between the blocks which is provided from the control unit 17. With this configuration, a useless contour-emphasized portion can be prevented from being generated in the video for visually recognizing the focus state.

Modified Example 6

[Regarding User Settings Relating to Block Connecting Function]

In the image pickup apparatus 1 described above, the following user's settings can be made relating to the above-mentioned block connecting function.

1. On/off of block connecting function
2. Number of divisions
3. Block size
4. Block position
5. Dial direction
6. On/off of multi-size divided area
7. Detail cancel The on/off of the block connecting function is a setting of switching the on/off of the block connecting function.

The number of divisions is a setting of the number of divided areas for spatially segmenting the first video signal. The number of divisions can be selected from 4 to a maximum number of divisions, for example. For example, when the number of divisions is 9, the first video signal is spatially divided into nine divided areas of 3 horizontal×3 vertical areas. When the number of divisions is 12, the first video signal is spatially divided into 12 divided areas of 4 horizontal×3 vertical areas. When the number of divisions is 16, the first video signal is spatially divided into 16 divided areas of 4 horizontal×4 vertical areas. When the number of divisions is 25, the first video signal is spatially divided into 25 divided areas of 5 horizontal×5 vertical areas. In addition, various settings of the number of divisions may be made with respect to the number or the aspect ratio. The upper limit of the number of divisions may be more than 25.

The block size is a setting of the size of the block (number of respective horizontal and vertical pixels) within the divided area. Alternatively, the block size may be set as a value of ratio to the size of the divided area.

The block position is a setting of the position of the block within the divided area. For example, as shown in FIG. 12, the divided area is divided into a total of 4 equal regions of 2 vertical×2 horizontal regions and a region of them which is to be used is set.

The dial direction is a setting of the number of divisions, the number of divisions with respect to a rotational operation direction (clockwise direction, counter-clockwise direction) of the operation element (dial) assigned to the setting of the block size, and increase/decrease in block size. For example, in a case where "9", "16", "25" are present as the number of divisions and "increase" is set in the clockwise direction of the dial, the number of divisions is switched in the order of 9→16→25 along with an increase in rotation amount (angle of rotation) in the clockwise direction of the dial, and the number of divisions is switched in the order of 25→16→9 along with an increase in rotation amount (angle of rotation)

in the counter-clockwise direction of the dial. The same applies to the dial direction assigned to the setting of the block size.

As shown in FIG. 9, for example, the on/off of the multi-size divided area is a setting of whether to utilize a multi-size divided area in which the size of the divided area of the middle portion of the first video signal is set to be larger than the size of the plurality of divided areas at the periphery.

The detail cancel is a setting of whether to cancel the detail processing.

Figure 14:
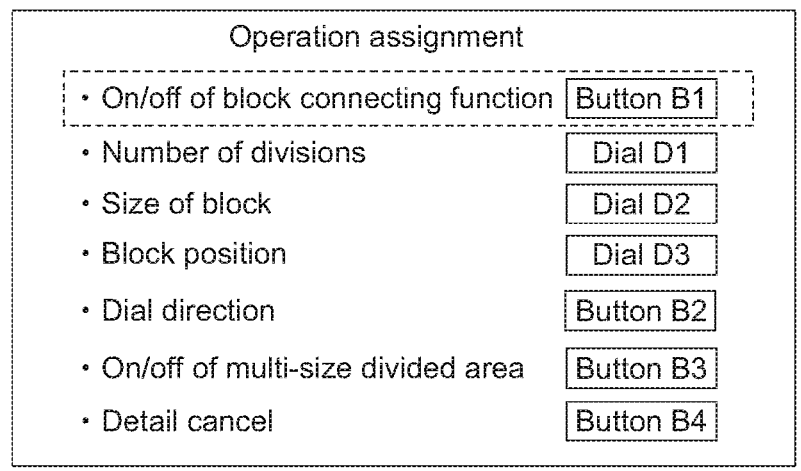
FIG. 14 A diagram showing a UI screen for user settings regarding a block connecting function.

FIG. 14 is a diagram showing a user interface (UI) screen for the above-mentioned user settings.

Regarding this UI, the VF 16 of the image pickup apparatus 1, an external display, or the like is used as a UI display unit, for example, and a particular operation button and the like provided in the image pickup apparatus 1 are used as a setting input unit.

On the UI screen, the operation element assigned for each setting item can be selected by the user from among a group including a plurality of operation elements. The operation element group which can be assigned to the setting items is a particular button group, a dial group, and the like provided in the operation input unit 18 of the image pickup apparatus 1.

Figure 15:
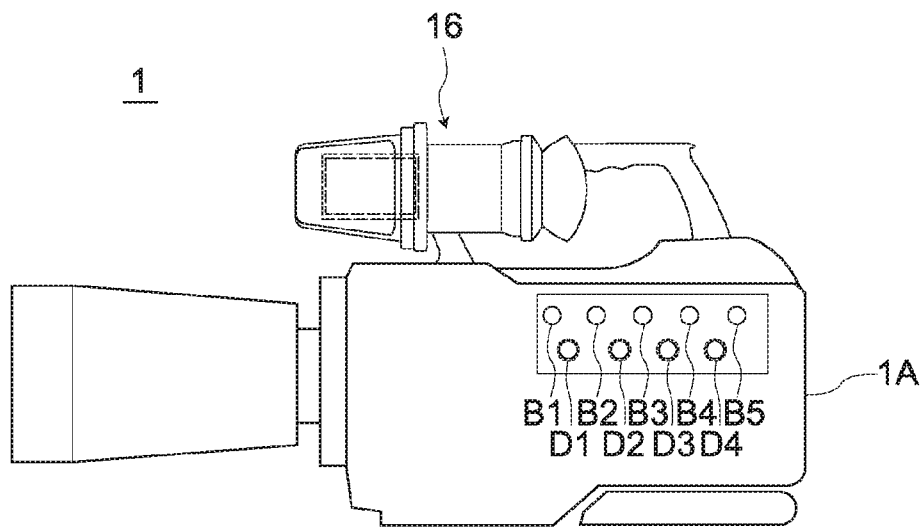
FIG. 15 A side view showing an operation element regarding the block connecting function of the image pickup apparatus 1.

FIG. 15 is a side view showing an operation element regarding the block connecting function of the image pickup apparatus 1. As shown in the figure, the image pickup apparatus 1 includes a plurality of buttons B1, B2, B3, B4, and B5 and a plurality of dials D1, D2, D3, and D4 as the operation element group to which the respective setting items regarding the block connecting function can be assigned.

It should be noted that in this figure, the case where the operation element group is provided on the side surface of the body 1A of the image pickup apparatus 1 is shown, the operation element group may be provided on another surface such as the upper surface or the like of the image pickup apparatus 1 or may be provided on the VF 16.

Next, a method in which the user assigns an arbitrary operation element of the operation element group of the image pickup apparatus 1 to an arbitrary setting item on the UI screen shown in FIG. 14 will be described.

It should be noted that a case where initial values of the operation elements are set to the respective setting items on the UI screen shown in FIG. 14 is assumed. For example, the operation element that is a button B1 is set to the setting of the on/off of the block connecting function, the operation element that is a dial D1 is set to the number of divisions, the operation element that is a dial D2 is set to the setting of the block size, the operation element that is a dial D3 is set to the setting of the block position, a button B2 is set to the setting of the dial direction, a button B3 is set to the setting of the on/off of the multi-size divided area, and then a button B4 is set to the setting of the detail cancel as the respective initial values.

Figure 16:
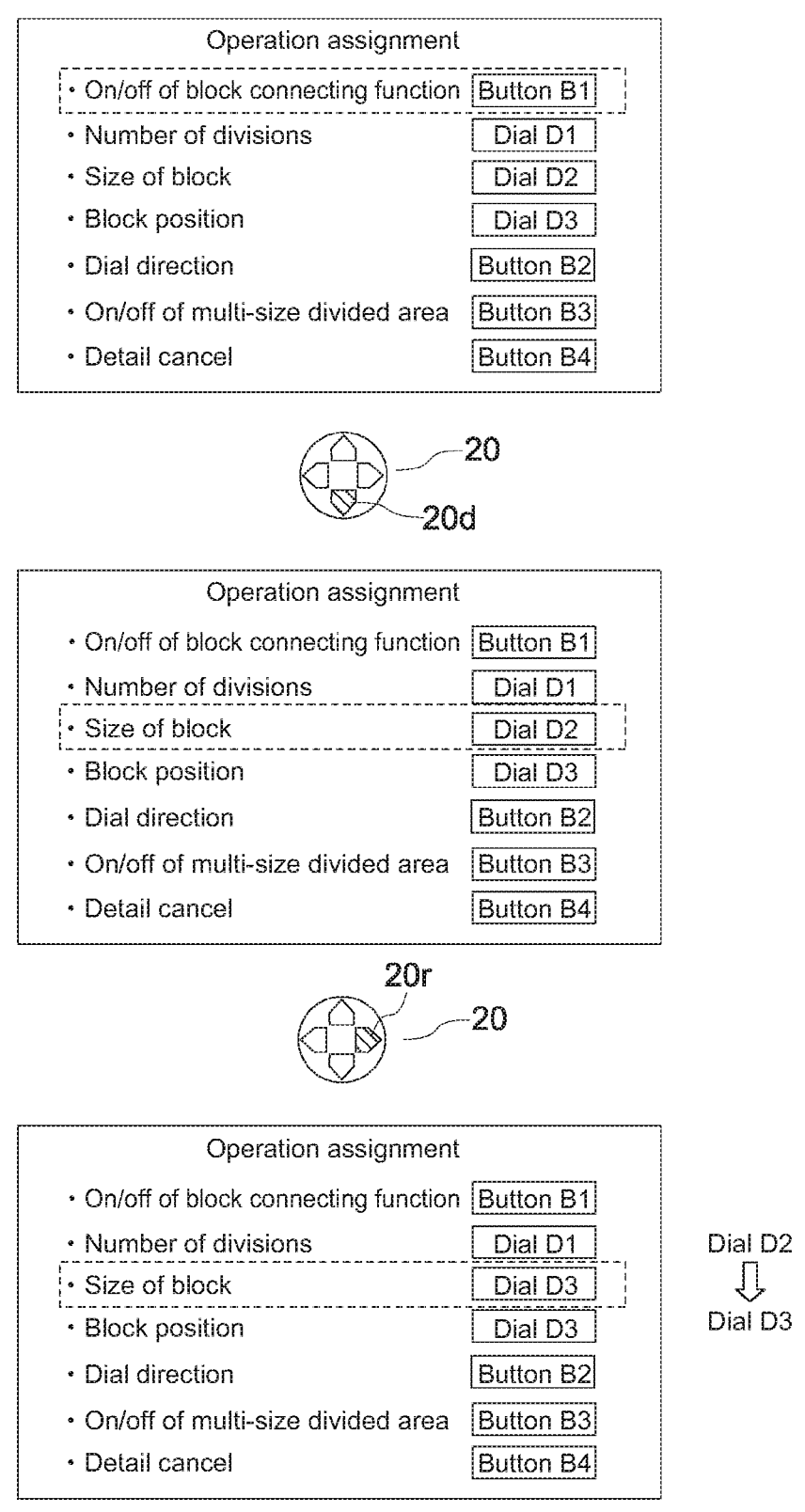

FIG. 16 is a diagram showing an operation method in a case of changing the operation element assigned to the setting of the block size from the dial D2 to the dial D3 on the UI screen shown in FIG. 14.

On the UI screen, the user selects a setting item, whose the operation element wished by the user to change, by operating cursor keys 20 and the like provided in the operation input unit 18, for example. For example, when a down key 20d of the cursor keys 20 is pressed twice, the setting item of the operation element which is a target to be changed moves from the on/off of the block connecting function to the block size. Next, a right key 20r of the cursor keys 20 is pressed once, the display of the operation element with respect to the setting item of the block size is changed from the dial D2 to the dial D3. With this configuration, the assignment of the operation element with respect to the setting item of the block size is changed from the dial D2 to the dial D3. It should be noted that when the right key 20r of the cursor keys 20 is pressed twice, the display of the operation element with respect to the setting item of the block size is changed from the dial D2 to a dial D4. With this configuration, the assignment of the operation element with respect to the setting item of the horizontal block size is changed from the dial D2 to the dial D4. In a similar way, the assignment of operation elements with respect to the other setting items can also be changed.

Figure 17:
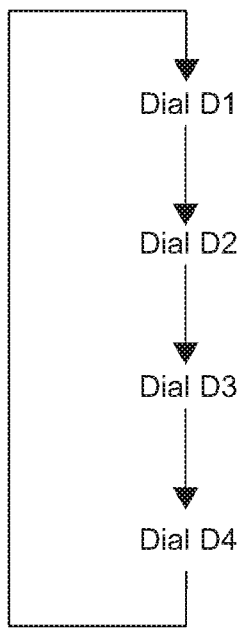
FIG. 17 A diagram showing a switching procedure between a plurality of dials on the UI screen shown in FIG. 14.
Figure 18:
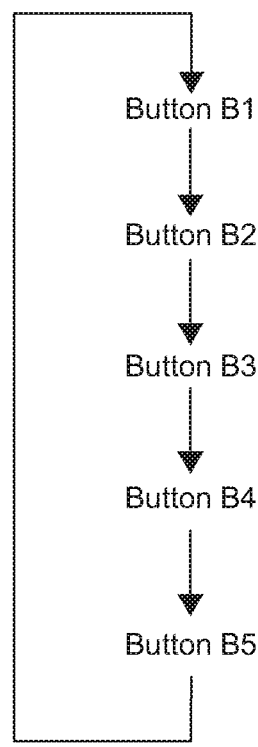
FIG. 18 A diagram showing a switching procedure between a plurality of a plurality of buttons on the UI screen shown in FIG. 14.

FIG. 17 is a diagram showing a switching procedure between the plurality of dials D1 to D4. As it can be seen, in a case where the dial before the setting is changed is the dial D2, the selected dial is switched in the order of the dial D3, the dial D4, and the dial D1 every time the right key 20r of the cursor keys 20 is pressed once. Further, as shown in FIG. 18, the buttons B1 to B5 can also be switched in accordance with a similar rule.

Figure 19:
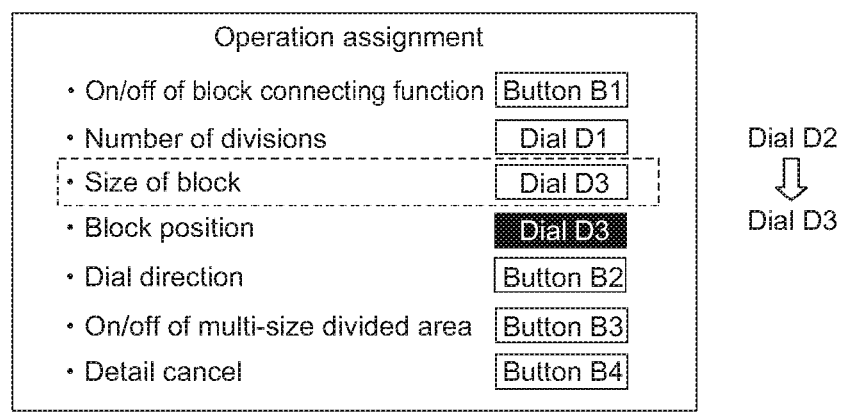
FIG. 19 A diagram showing a display example in a case where a setting in which operation elements overlap occurs on the UI screen shown in FIG. 14.

It should be noted that when the assignment of the operation element with respect to the setting item of the number of horizontal center portion pixels is changed from the dial D2 to the dial D3, it overlaps the operation element assigned to the setting item of the block position. In a case where the operation elements with respect to the plurality of setting items overlap as such, that operation item is displayed in a state in which it can be identified by reverse display and the like so as to prompt to change the setting of the operation element with respect to the operation item (e.g., the setting item of the block position) to which that operation element has been assigned as shown in FIG. 19. With this configuration, the user can change the assignment of the operation element to avoid the overlap setting of the operation element.

[Reflection in Real Time of VF Video Generation Along with Change in Setting]

The user operates the respective operation elements assigned to the respective setting items regarding the block connecting function at a time of image pickup, to thereby change the appearance of the second video signal display on the VF 16, the external display, and the like in real time. With this configuration, the user can select an optimal setting value in the focus adjustment by visual recognition.

That is, the control unit 17 respectively detects the state of each operation element individually assigned to each setting item regarding the block connecting function in the operation input unit 18. The control unit 17 generates each setting value corresponding to the detected state and sets it in the VF signal processing unit 15. The VF signal processing unit 15 generates a VF video signal on the basis of each setting value given by the control unit 17 and outputs it to the VF 16.

Application Example

The technology according to the present disclosure can be applied to various products. For example, the technology according to the present disclosure may be applied to an endoscopic surgery system.

Figure 20:
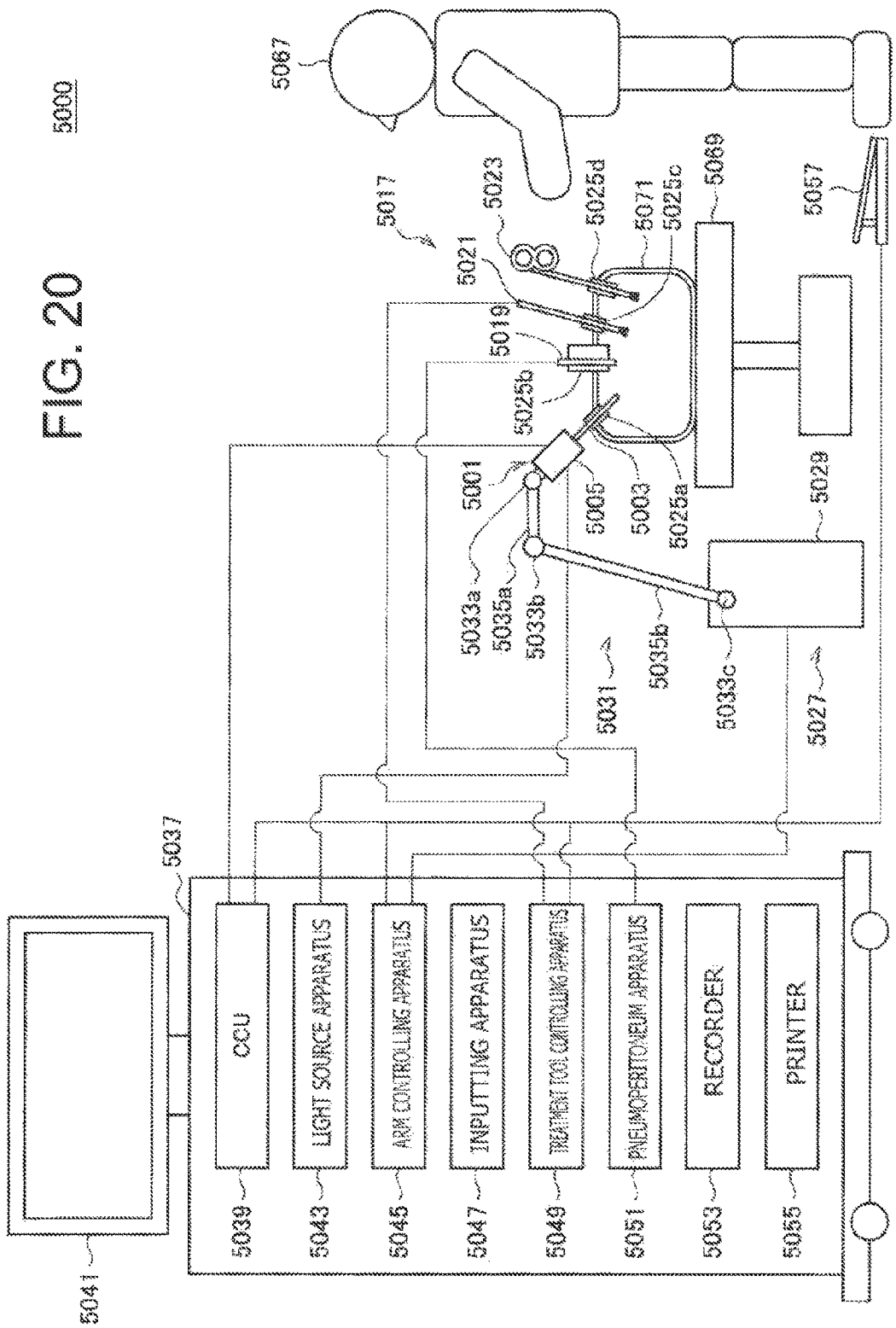
FIG. 20 A view depicting an example of a schematic configuration of an endoscopic surgery system.

FIG. 20 is a view depicting an example of a schematic configuration of an endoscopic surgery system 5000 to which the technology according to an embodiment of the present disclosure can be applied. In FIG. 20, a state is illustrated in which a surgeon (medical doctor) 5067 is using the endoscopic surgery system 5000 to perform surgery for a patient 5071 on a patient bed 5069. As depicted, the endoscopic surgery system 5000 includes an endoscope 5001, other surgical tools 5017, a supporting arm apparatus 5027 which supports the endoscope 5001 thereon, and a cart 5037 on which various apparatus for endoscopic surgery are mounted.

In endoscopic surgery, in place of incision of the abdominal wall to perform laparotomy, a plurality of tubular aperture devices called trocars 5025a to 5025d are used to puncture the abdominal wall. Then, a lens barrel 5003 of the endoscope 5001 and the other surgical tools 5017 are inserted into body cavity of the patient 5071 through the trocars 5025a to 5025d. In the example depicted, as the other surgical tools 5017, a pneumoperitoneum tube 5019, an energy device 5021 and forceps 5023 are inserted into body cavity of the patient 5071. Further, the energy device 5021 is a treatment tool for performing incision and peeling of a tissue, sealing of a blood vessel or the like by high frequency current or ultrasonic vibration. However, the surgical tools 5017 depicted are mere examples at all, and as the surgical tools 5017, various surgical tools which are generally used in endoscopic surgery such as, for example, tweezers or a retractor may be used.

An image of a surgical region in a body cavity of the patient 5071 imaged by the endoscope 5001 is displayed on a display apparatus 5041. The surgeon 5067 would use the energy device 5021 or the forceps 5023 while watching the image of the surgical region displayed on the display apparatus 5041 on the real time basis to perform such treatment as, for example, resection of an affected area. It is to be noted that, though not depicted, the pneumoperitoneum tube 5019, the energy device 5021 and the forceps 5023 are supported by the surgeon 5067, an assistant or the like during surgery.

(Supporting Arm Apparatus)

The supporting arm apparatus 5027 includes an arm unit 5031 extending from a base unit 5029. In the example depicted, the arm unit 5031 includes joint portions 5033a, 5033b and 5033c and links 5035a and 5035b and is driven under the control of an arm controlling apparatus 5045. The endoscope 5001 is supported by the arm unit 5031 such that the position and the posture of the endoscope 5001 are controlled. Consequently, stable fixation in position of the endoscope 5001 can be implemented.

(Endoscope)

The endoscope 5001 includes the lens barrel 5003 which has a region of a predetermined length from a distal end thereof to be inserted into a body cavity of the patient 5071, and a camera head 5005 connected to a proximal end of the lens barrel 5003. In the example depicted, the endoscope 5001 is depicted as a rigid endoscope having the lens barrel 5003 of the hard type. However, the endoscope 5001 may otherwise be configured as a flexible endoscope having the lens barrel 5003 of the flexible type.

The lens barrel 5003 has, at a distal end thereof, an opening in which an objective lens is fitted. A light source apparatus 5043 is connected to the endoscope 5001 such that light generated by the light source apparatus 5043 is introduced to a distal end of the lens barrel by a light guide extending in the inside of the lens barrel 5003 and is irradiated toward an observation target in a body cavity of the patient 5071 through the objective lens. It is to be noted that the endoscope 5001 may be a forward-viewing endoscope or may be an oblique-viewing endoscope or a side-viewing endoscope.

An optical system and an image pickup element are provided in the inside of the camera head 5005 such that reflected light (observation light) from an observation target is condensed on the image pickup element by the optical system. The observation light is photo-electrically converted by the image pickup element to generate an electric signal corresponding to the observation light, namely, an image signal corresponding to an observation image. The image signal is transmitted as RAW data to a CCU 5039. It is to be noted that the camera head 5005 has a function incorporated therein for suitably driving the optical system of the camera head 5005 to adjust the magnification and the focal distance.

It is to be noted that, in order to establish compatibility with, for example, a stereoscopic vision (three dimensional (3D) display), a plurality of image pickup elements may be provided on the camera head 5005. In this case, a plurality of relay optical systems are provided in the inside of the lens barrel 5003 in order to guide observation light to each of the plurality of image pickup elements.

(Various Apparatus Incorporated in Cart)

The CCU 5039 includes a central processing unit (CPU), a graphics processing unit (GPU) or the like and integrally controls operation of the endoscope 5001 and the display apparatus 5041. In particular, the CCU 5039 performs, for an image signal received from the camera head 5005, various image processes for displaying an image based on the image signal such as, for example, a development process (demosaic process). The CCU 5039 provides the image signal for which the image processes have been performed to the display apparatus 5041. Further, the CCU 5039 transmits a control signal to the camera head 5005 to control driving of the camera head 5005. The control signal may include information relating to an image pickup condition such as a magnification or a focal distance.

The display apparatus 5041 displays an image based on an image signal for which the image processes have been performed by the CCU 5039 under the control of the CCU 5039. If the endoscope 5001 is ready for imaging of a high resolution such as 4K (horizontal pixel number 3840× vertical pixel number 2160), 8K (horizontal pixel number 7680×vertical pixel number 4320) or the like and/or ready for 3D display, then a display apparatus by which corresponding display of the high resolution and/or 3D display are possible may be used as the display apparatus 5041. Where the apparatus is ready for imaging of a high resolution such as 4K or 8K, if the display apparatus used as the display apparatus 5041 has a size of equal to or not less than 55 inches, then a more immersive experience can be obtained. Further, a plurality of display apparatus 5041 having different resolutions and/or different sizes may be provided in accordance with purposes.

The light source apparatus 5043 includes a light source such as, for example, a light emitting diode (LED) and supplies irradiation light for imaging of a surgical region to the endoscope 5001.

The arm controlling apparatus 5045 includes a processor such as, for example, a CPU and operates in accordance with a predetermined program to control driving of the arm unit 5031 of the supporting arm apparatus 5027 in accordance with a predetermined controlling method.

An inputting apparatus 5047 is an input interface for the endoscopic surgery system 5000. A user can perform inputting of various kinds of information or instruction inputting to the endoscopic surgery system 5000 through the inputting apparatus 5047. For example, the user would input various kinds of information relating to surgery such as physical information of a patient, information regarding a surgical procedure of the surgery and so forth through the inputting apparatus 5047. Further, the user would input, for example, an instruction to drive the arm unit 5031, an instruction to change an image pickup condition (type of irradiation light, magnification, focal distance or the like) by the endoscope 5001, an instruction to drive the energy device 5021 or the like through the inputting apparatus 5047.

The type of the inputting apparatus 5047 is not limited and may be that of any one of various known inputting apparatus. As the inputting apparatus 5047, for example, a mouse, a keyboard, a touch panel, a switch, a foot switch 5057 and/or a lever or the like may be applied. Where a touch panel is used as the inputting apparatus 5047, it may be provided on the display face of the display apparatus 5041.

Otherwise, the inputting apparatus 5047 is a device to be mounted on a user such as, for example, a glasses type wearable device or a head mounted display (HMD), and various kinds of inputting are performed in response to a gesture or a line of sight of the user detected by any of the devices mentioned. Further, the inputting apparatus 5047 includes a camera which can detect a motion of a user, and various kinds of inputting are performed in response to a gesture or a line of sight of a user detected from a video imaged by the camera. Further, the inputting apparatus 5047 includes a microphone which can collect the voice of a user, and various kinds of inputting are performed by voice collected by the microphone. By configuring the inputting apparatus 5047 such that various kinds of information can be inputted in a contactless fashion in this manner, especially a user who belongs to a clean area (for example, the surgeon 5067) can operate an apparatus belonging to an unclean area in a contactless fashion. Further, since the user can operate an apparatus without releasing a possessed surgical tool from its hand, the convenience to the user is improved.

A treatment tool controlling apparatus 5049 controls driving of the energy device 5021 for cautery or incision of a tissue, sealing of a blood vessel or the like. A pneumoperitoneum apparatus 5051 feeds gas into a body cavity of the patient 5071 through the pneumoperitoneum tube 5019 to inflate the body cavity in order to secure the field of view of the endoscope 5001 and secure the working space for the surgeon. A recorder 5053 is an apparatus capable of recording various kinds of information relating to surgery. A printer 5055 is an apparatus capable of printing various kinds of information relating to surgery in various forms such as a text, an image or a graph.

In the following, especially a characteristic configuration of the endoscopic surgery system 5000 is described in more detail.

(Supporting Arm Apparatus)

The supporting arm apparatus 5027 includes the base unit 5029 serving as a base, and the arm unit 5031 extending from the base unit 5029. In the example depicted, the arm unit 5031 includes the plurality of joint portions 5033a, 5033b and 5033c and the plurality of links 5035a and 5035b connected to each other by the joint portion 5033b. In FIG. 20, for simplified illustration, the configuration of the arm unit 5031 is depicted in a simplified form. Actually, the shape, number and arrangement of the joint portions 5033a to 5033c and the links 5035a and 5035b and the direction and so forth of axes of rotation of the joint portions 5033a to 5033c can be set suitably such that the arm unit 5031 has a desired degree of freedom. For example, the arm unit 5031 may preferably be configured such that it has a degree of freedom equal to or not less than 6 degrees of freedom. This makes it possible to move the endoscope 5001 freely within the movable range of the arm unit 5031. Consequently, it becomes possible to insert the lens barrel 5003 of the endoscope 5001 from a desired direction into a body cavity of the patient 5071.

An actuator is provided in each of the joint portions 5033a to 5033c, and the joint portions 5033a to 5033c are configured such that they are rotatable around predetermined axes of rotation thereof by driving of the respective actuators. The driving of the actuators is controlled by the arm controlling apparatus 5045 to control the rotational angle of each of the joint portions 5033a to 5033c thereby to control driving of the arm unit 5031. Consequently, control of the position and the posture of the endoscope 5001 can be implemented. Thereupon, the arm controlling apparatus 5045 can control driving of the arm unit 5031 by various known controlling methods such as force control or position control.

For example, if the surgeon 5067 suitably performs operation inputting through the inputting apparatus 5047 (including the foot switch 5057), then driving of the arm unit 5031 may be controlled suitably by the arm controlling apparatus 5045 in response to the operation input to control the position and the posture of the endoscope 5001. After the endoscope 5001 at the distal end of the arm unit 5031 is moved from an arbitrary position to a different arbitrary position by the control just described, the endoscope 5001 can be supported fixedly at the position after the movement. It is to be noted that the arm unit 5031 may be operated in a master-slave fashion. In this case, the arm unit 5031 may be remotely controlled by the user through the inputting apparatus 5047 which is placed at a place remote from the operating room.

Further, where force control is applied, the arm controlling apparatus 5045 may perform power-assisted control to drive the actuators of the joint portions 5033a to 5033c such that the arm unit 5031 may receive external force by the user and move smoothly following the external force. This makes it possible to move, when the user directly touches with and moves the arm unit 5031, the arm unit 5031 with comparatively weak force. Accordingly, it becomes possible for the user to move the endoscope 5001 more intuitively by a simpler and easier operation, and the convenience to the user can be improved.

Here, generally in endoscopic surgery, the endoscope 5001 is supported by a medical doctor called scopist. In contrast, where the supporting arm apparatus 5027 is used, the position of the endoscope 5001 can be fixed more certainly without hands, and therefore, an image of a surgical region can be obtained stably and surgery can be performed smoothly.

It is to be noted that the arm controlling apparatus 5045 may not necessarily be provided on the cart 5037. Further, the arm controlling apparatus 5045 may not necessarily be a single apparatus. For example, the arm controlling apparatus 5045 may be provided in each of the joint portions 5033a to 5033c of the arm unit 5031 of the supporting arm apparatus 5027 such that the plurality of arm controlling apparatus 5045 cooperate with each other to implement driving control of the arm unit 5031.

(Light Source Apparatus)

The light source apparatus 5043 supplies irradiation light upon imaging of a surgical region to the endoscope 5001. The light source apparatus 5043 includes a white light source which includes, for example, an LED, a laser light source or a combination of them. In this case, where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 5043. Further, in this case, if laser beams from the respective RGB laser light sources are irradiated time-divisionally on an observation target and driving of the image pickup elements of the camera head 5005 is controlled in synchronism with the irradiation timings, then images individually corresponding to the R, G and B colors can be picked up time-divisionally. According to the method just described, a color image can be obtained even if a color filter is not provided for the image pickup element.

Further, driving of the light source apparatus 5043 may be controlled such that the intensity of light to be outputted is changed for each predetermined time. By controlling driving of the image pickup element of the camera head 5005 in synchronism with the timing of the change of the intensity of light to acquire images time-divisionally and synthesizing the images, an image of a high dynamic range free from underexposed blocked up shadows and overexposed highlights can be created.

Further, the light source apparatus 5043 may be configured to supply light of a predetermined wavelength band ready for special light observation. In special light observation, for example, by utilizing the wavelength dependency of absorption of light in a body tissue to irradiate light of a narrower wavelength band in comparison with irradiation light upon ordinary observation (namely, white light), narrow band light observation (narrow band imaging) of imaging a predetermined tissue such as a blood vessel of a superficial portion of the mucous membrane or the like in a high contrast is performed. Alternatively, in special light observation, fluorescent observation for obtaining an image from fluorescent light generated by irradiation of excitation light may be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 5043 can be configured to supply such narrow-band light and/or excitation light suitable for special light observation as described above.

(Camera Head and CCU)

Figure 21:
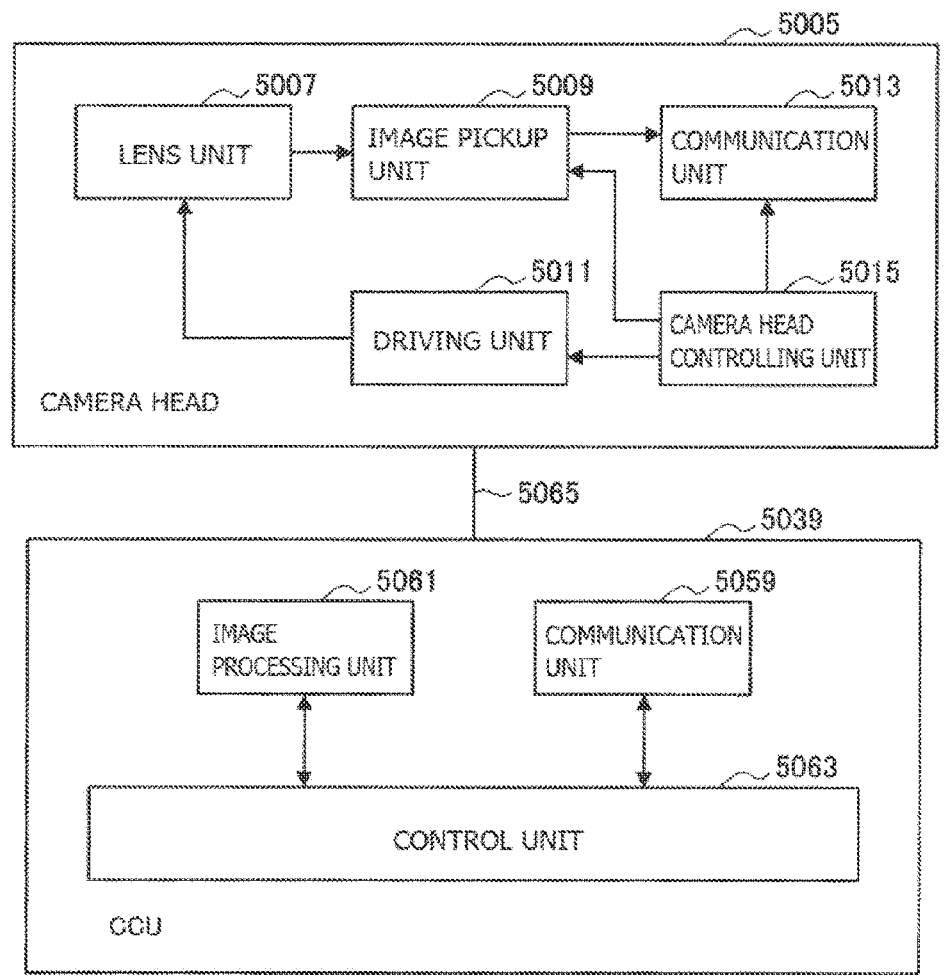
FIG. 21 A block diagram depicting an example of a functional configuration of a camera head and a camera control unit (CCU) depicted in FIG. 20.

Functions of the camera head 5005 of the endoscope 5001 and the CCU 5039 are described in more detail with reference to FIG. 21. FIG. 21 is a block diagram depicting an example of a functional configuration of the camera head 5005 and the CCU 5039 depicted in FIG. 20.

Referring to FIG. 21, the camera head 5005 has, as functions thereof, a lens unit 5007, an image pickup unit 5009, a driving unit 5011, a communication unit 5013 and a camera head controlling unit 5015. Further, the CCU 5039 has, as functions thereof, a communication unit 5059, an image processing unit 5061 and a control unit 5063. The camera head 5005 and the CCU 5039 are connected to be bidirectionally communicable to each other by a transmission cable 5065.

First, a functional configuration of the camera head 5005 is described. The lens unit 5007 is an optical system provided at a connecting location of the camera head 5005 to the lens barrel 5003. Observation light taken in from a distal end of the lens barrel 5003 is introduced into the camera head 5005 and enters the lens unit 5007. The lens unit 5007 includes a combination of a plurality of lenses including a zoom lens and a focusing lens. The lens unit 5007 has optical properties adjusted such that the observation light is condensed on a light receiving face of the image pickup element of the image pickup unit 5009. Further, the zoom lens and the focusing lens are configured such that the positions thereof on their optical axis are movable for adjustment of the magnification and the focal point of a picked up image.

The image pickup unit 5009 includes an image pickup element and disposed at a succeeding stage to the lens unit 5007. Observation light having passed through the lens unit 5007 is condensed on the light receiving face of the image pickup element, and an image signal corresponding to the observation image is generated by photoelectric conversion of the image pickup element. The image signal generated by the image pickup unit 5009 is provided to the communication unit 5013.

As the image pickup element which is included by the image pickup unit 5009, an image sensor, for example, of the complementary metal oxide semiconductor (CMOS) type is used which has a Bayer array and is capable of picking up an image in color. It is to be noted that, as the image pickup element, an image pickup element may be used which is ready, for example, for imaging of an image of a high resolution equal to or not less than 4K. If an image of a surgical region is obtained in a high resolution, then the surgeon 5067 can comprehend a state of the surgical region in enhanced details and can proceed with the surgery more smoothly.

Further, the image pickup element which is included by the image pickup unit 5009 includes such that it has a pair of image pickup elements for acquiring image signals for the right eye and the left eye compatible with 3D display. Where 3D display is applied, the surgeon 5067 can comprehend the depth of a living body tissue in the surgical region more accurately. It is to be noted that, if the image pickup unit 5009 is configured as that of the multi-plate type, then a plurality of systems of lens units 5007 are provided corresponding to the individual image pickup elements of the image pickup unit 5009.

The image pickup unit 5009 may not necessarily be provided on the camera head 5005. For example, the image pickup unit 5009 may be provided just behind the objective lens in the inside of the lens barrel 5003.

The driving unit 5011 includes an actuator and moves the zoom lens and the focusing lens of the lens unit 5007 by a predetermined distance along the optical axis under the control of the camera head controlling unit 5015. Consequently, the magnification and the focal point of a picked up image by the image pickup unit 5009 can be adjusted suitably.

The communication unit 5013 includes a communication apparatus for transmitting and receiving various kinds of information to and from the CCU 5039. The communication unit 5013 transmits an image signal acquired from the image pickup unit 5009 as RAW data to the CCU 5039 through the transmission cable 5065. Thereupon, in order to display a picked up image of a surgical region in low latency, preferably the image signal is transmitted by optical communication. This is because, upon surgery, the surgeon 5067 performs surgery while observing the state of an affected area through a picked up image, it is demanded for a moving image of the surgical region to be displayed on the real time basis as far as possible in order to achieve surgery with a higher degree of safety and certainty. Where optical communication is applied, a photoelectric conversion module for converting an electric signal into an optical signal is provided in the communication unit 5013. After the image signal is converted into an optical signal by the photoelectric conversion module, it is transmitted to the CCU 5039 through the transmission cable 5065.

Further, the communication unit 5013 receives a control signal for controlling driving of the camera head 5005 from the CCU 5039. The control signal includes information relating to image pickup conditions such as, for example, information that a frame rate of a picked up image is designated, information that an exposure value upon image picking up is designated and/or information that a magnification and a focal point of a picked up image are designated. The communication unit 5013 provides the received control signal to the camera head controlling unit 5015. It is to be noted that also the control signal from the CCU 5039 may be transmitted by optical communication. In this case, a photoelectric conversion module for converting an optical signal into an electric signal is provided in the communication unit 5013. After the control signal is converted into an electric signal by the photoelectric conversion module, it is provided to the camera head controlling unit 5015.

It is to be noted that the image pickup conditions such as the frame rate, exposure value, magnification or focal point are set automatically by the control unit 5063 of the CCU 5039 on the basis of an acquired image signal. In other words, an auto exposure (AE) function, an auto focus (AF) function and an auto white balance (AWB) function are incorporated in the endoscope 5001.

The camera head controlling unit 5015 controls driving of the camera head 5005 on the basis of a control signal from the CCU 5039 received through the communication unit 5013. For example, the camera head controlling unit 5015 controls driving of the image pickup element of the image pickup unit 5009 on the basis of information that a frame rate of a picked up image is designated and/or information that an exposure value upon image picking up is designated. Further, for example, the camera head controlling unit 5015 controls the driving unit 5011 to suitably move the zoom lens and the focus lens of the lens unit 5007 on the basis of information that a magnification and a focal point of a picked up image are designated. The camera head controlling unit 5015 may further include a function for storing information for identifying the lens barrel 5003 and/or the camera head 5005.

It is to be noted that, by disposing the components such as the lens unit 5007 and the image pickup unit 5009 in a sealed structure having high airtightness and waterproof, the camera head 5005 can be provided with resistance to an autoclave sterilization process.

Now, a functional configuration of the CCU 5039 is described. The communication unit 5059 includes a communication apparatus for transmitting and receiving various kinds of information to and from the camera head 5005. The communication unit 5059 receives an image signal transmitted thereto from the camera head 5005 through the transmission cable 5065. Thereupon, the image signal may be transmitted preferably by optical communication as described above. In this case, for the compatibility with optical communication, the communication unit 5059 includes a photoelectric conversion module for converting an optical signal into an electric signal. The communication unit 5059 provides the image signal after conversion into an electric signal to the image processing unit 5061.

Further, the communication unit 5059 transmits, to the camera head 5005, a control signal for controlling driving of the camera head 5005. The control signal may also be transmitted by optical communication.

The image processing unit 5061 performs various image processes for an image signal in the form of RAW data transmitted thereto from the camera head 5005. The image processes include various known signal processes such as, for example, a development process, an image quality improving process (a bandwidth enhancement process, a super-resolution process, a noise reduction (NR) process and/or an image stabilization process) and/or an enlargement process (electronic zooming process). Further, the image processing unit 5061 performs a detection process for an image signal in order to perform AE, AF and AWB.

The image processing unit 5061 includes a processor such as a CPU or a GPU, and when the processor operates in accordance with a predetermined program, the image processes and the detection process described above can be performed. It is to be noted that, where the image processing unit 5061 includes a plurality of GPUs, the image processing unit 5061 suitably divides information relating to an image signal such that image processes are performed in parallel by the plurality of GPUs.

The control unit 5063 performs various kinds of control relating to image picking up of a surgical region by the endoscope 5001 and display of the picked up image. For example, the control unit 5063 generates a control signal for controlling driving of the camera head 5005. Thereupon, if image pickup conditions are inputted by the user, then the control unit 5063 generates a control signal on the basis of the input by the user. Alternatively, where the endoscope 5001 has an AE function, an AF function and an AWB function incorporated therein, the control unit 5063 suitably calculates an optimum exposure value, focal distance and white balance in response to a result of a detection process by the image processing unit 5061 and generates a control signal.

Further, the control unit 5063 controls the display apparatus 5041 to display an image of a surgical region on the basis of an image signal for which image processes have been performed by the image processing unit 5061. Thereupon, the control unit 5063 recognizes various objects in the surgical region image using various image recognition technologies. For example, the control unit 5063 can recognize a surgical tool such as forceps, a particular living body region, bleeding, mist when the energy device 5021 is used and so forth by detecting the shape, color and so forth of edges of the objects included in the surgical region image. The control unit 5063 causes, when it controls the display unit 5041 to display a surgical region image, various kinds of surgery supporting information to be displayed in an overlapping manner with an image of the surgical region using a result of the recognition. Where surgery supporting information is displayed in an overlapping manner and presented to the surgeon 5067, the surgeon 5067 can proceed with the surgery more safety and certainty.

The transmission cable 5065 which connects the camera head 5005 and the CCU 5039 to each other is an electric signal cable ready for communication of an electric signal, an optical fiber ready for optical communication or a composite cable ready for both of electrical and optical communication.

Here, while, in the example depicted, communication is performed by wired communication using the transmission cable 5065, the communication between the camera head 5005 and the CCU 5039 may be performed otherwise by wireless communication. Where the communication between the camera head 5005 and the CCU 5039 is performed by wireless communication, there is no necessity to lay the transmission cable 5065 in the operating room.

Therefore, such a situation that movement of medical staff in the operating room is disturbed by the transmission cable 5065 can be eliminated.

Hereinabove, the example of the endoscopic surgery system 5000 to which the technology according to the present disclosure can be applied has been described. It should be noted that although the endoscopic surgery system 5000 is described here as an example, the system to which the technology according to the present disclosure can be applied is not limited to such an example. For example, the technology according to the present disclosure may be applied to a flexible endoscopic system for examination and a microscopic surgery system.

In a case of adding a second display apparatus having a screen resolution lower than that of the display apparatus 5041 to the above-mentioned configurations, the technology according to the present disclosure can be favorably applied in processing of generating, at the CCU 5039, an image to be displayed on the second display apparatus from the image captured by the camera head 5005. With this configuration, the video signal with which the focus state at the position of each divided area can be visually recognized on the screen of the second display apparatus having the lower screen resolution is obtained. Therefore, without requiring an operation of moving the region of the image to be displayed on the screen of the second display apparatus, the surgeon 5067 can start an operation of focusing on an arbitrary divided area and can rapidly perform focus adjustment. Thus, the surgery can be more safely and more reliably performed.

It should be noted that the present technology may also take the following configurations. (1) An image pickup apparatus, including:

an image pickup unit including an image pickup element;

a first video signal processing unit that generates a first video signal having a first resolution from a pixel signal obtained by the image pickup unit;

a second video signal processing unit that sets a plurality of divided areas for spatially segmenting the first video signal generated by the first video signal processing unit, cuts out the first video signal in a region smaller than a size of the corresponding divided area as a block from the first video signal in each of the individual divided areas, and connects them to one another, to thereby generate a second video signal having a second resolution lower than the first resolution; and a view finder that displays the second video signal.

(2) The image pickup apparatus according to (1), in which the size of the divided area includes 3 horizontal×3 vertical pixels or more and the size of the block includes either 2 horizontal×1 vertical pixels or more or 1 horizontal×2 vertical pixels or more.

(3) The image pickup apparatus according to (1) or (2), in which the second video signal processing unit is configured to segment the first video signal into one or more divided areas having a first size and a plurality of divided areas having a second size smaller than the first size.

(4) The image pickup apparatus according to (3), in which the second video signal processing unit is configured to arrange the one or more divided areas having the first size at a center portion of a video space according to the first video signal and arrange the plurality of divided areas having the second size at a periphery of the one or more divided areas having the first size.

(5) The image pickup apparatus according to any of (1) to (4), in which
the second video signal processing unit is configured to set the individual block at such a position that the individual block is present over the plurality of divided areas.

(6) The image pickup apparatus according to any of (1) to (5), in which
the second video signal processing unit further includes
a downconverter that generates a third video signal having the second resolution from the first video signal by downconversion, and
a switching unit that switches between the second video signal and the third video signal.

(7) The image pickup apparatus according to any of (1) to (6), in which
the second video signal processing unit further includes a detail processing unit that performs processing of emphasizing a contour of the second video signal by skipping a joint between the blocks.

(8) The image pickup apparatus according to any of (1) to (7), further including
an output unit that outputs the second video signal generated by the second video signal processing unit to an external apparatus.

(9) The image pickup apparatus according to any of (1) to (8), in which
an operation input unit including a group including a plurality of operation elements including a first operation element that receives user's setting information of the number of divided areas, and
the control unit is configured to detect a state of the first operation element at a time of image pickup and reflect the setting information to an operation of the second video signal processing unit in real time.

(10) The image pickup apparatus according to (9), in which
the operation element group further includes a second operation element that receives user's setting information of the size of the block, and
the control unit is configured to detect a state of the second operation element at a time of image pickup and reflects the setting information to the operation of the second video signal processing unit in real time.

(11) The image pickup apparatus according to (9) or (10), in which
the operation element group includes a third operation element that receives user's setting information of a position of the block, and
the control unit is configured to detect a state of the third operation element at a time of image pickup and reflect the setting information to the operation of the second video signal processing unit in real time.

(12) The image pickup apparatus according to any of (9) to (11), in which
the operation element group includes a fourth operation element that receives, from a user, setting information of on/off of segmenting the first video signal into the one or more divided areas having the first size and the plurality of divided areas having the second size, and
the control unit is configured to detect a state of the fourth operation element at a time of image pickup and reflect the setting information to the operation of the second video signal processing unit in real time.

(13) The image pickup apparatus according to (12), further including
a user interface that enables assignment of the first operation element, the second operation element, the third operation element, and the fourth operation element in the operation element group to be set.

(14) An image pickup apparatus, including:
an image pickup unit including an image pickup element;
a first video signal processing unit that generates a first video signal having a first resolution from a pixel signal obtained by the image pickup unit;
a second video signal processing unit that generates a downconverted video by downconverting the first video signal in an outer edge portion, sets a plurality of divided areas for spatially segmenting the first video signal in a region inside the outer edge portion, cuts out the first video signal in a region smaller than a size of the corresponding divided area as a block from the first video signal in each of the individual divided areas, and connects the blocks to one another to thereby generate block-connected video, and connects the downconverted video and the block-connected video to each other to thereby generate a second video signal having a second resolution lower than the first resolution; and
a view finder that displays the second video signal.
(15) The image pickup apparatus according to (14), in which
the size of the divided area includes 3 horizontal×3 vertical pixels or more and the size of the block includes either 2 horizontal×1 vertical pixels or more or 1 horizontal×2 vertical pixels or more.
(16) The image pickup apparatus according to (14) or (15), in which
the second video signal processing unit is configured to segment the first video signal into one or more divided areas having a first size and a plurality of divided areas having a second size smaller than the first size.
(17) The image pickup apparatus according to (16), in which
the second video signal processing unit is configured to arrange the one or more divided areas having the first size at a center portion of a video space according to the first video signal and arrange the plurality of divided areas having the second size at a periphery of the one or more divided areas having the first size.
(18) The image pickup apparatus according to any of (14) to (17), in which
the second video signal processing unit is configured to set the individual block at such a position that the individual block is present over the plurality of divided areas.
(19) The image pickup apparatus according to any of (14) to (18), in which
the second video signal processing unit further includes
a downconverter that generates a third video signal having the second resolution from the first video signal by downconversion, and
a switching unit that switches between the second video signal and the third video signal.
(20) The image pickup apparatus according to any of (14) to (18), in which
the second video signal processing unit further includes a detail processing unit that performs processing of emphasizing a contour of the second video signal by skipping a joint between the blocks.
(21) The image pickup apparatus according to any of (14) to (20), further including
an output unit that outputs the second video signal generated by the second video signal processing unit to an external apparatus.
(22) The image pickup apparatus according to any of (14) to (20), in which an operation input unit including a group including a plurality of operation elements including a first operation element that receives user's setting information of the number of divided areas, and
the control unit is configured to detect a state of the first operation element at a time of image pickup and reflect the setting information to the operation of the second video signal processing unit in real time.
(23) The image pickup apparatus according to (22), in which
the operation element group further includes a second operation element that receives user's setting information of the size of the block, and
the control unit is configured to detect a state of the second operation element at a time of image pickup and reflect the setting information to the operation of the second video signal processing unit in real time.
(24) The image pickup apparatus according to (22) or (23), in which
the operation element group includes a third operation element that receives user's setting information of the position of the block, and
the control unit is configured to detect a state of the third operation element at a time of image pickup and reflect the setting information to the operation of the second video signal processing unit in real time.
(25) The image pickup apparatus according to any of (22) to (24), in which
the operation element group includes a fourth operation element that receives, from a user, setting information of on/off of segmenting the first video signal into the one or more divided areas having the first size and the plurality of divided areas having the second size, and
the control unit is configured to detect a state of the fourth operation element at a time of image pickup and reflect the setting information to the operation of the second video signal processing unit in real time.
(26) The image pickup apparatus according to (25), further including
a user interface that enables assignment of the first operation element, the second operation element, the third operation element, and the fourth operation element in the operation element group to be set.
(27) A video signal processing apparatus, including:
a first video signal processing unit that generates a first video signal having a first resolution from a pixel signal obtained by an image pickup apparatus; and
a second video signal processing unit that sets a plurality of divided areas for spatially segmenting the first video signal generated by the first video signal processing unit, cuts out the first video signal in a region smaller than a size of the corresponding divided area as a block from the first video signal in each of the individual divided areas, and connects the blocks to one another to thereby generate a second video signal having a second resolution lower than the first resolution.
(28) The video signal processing apparatus according to (27), in which
the size of the divided area includes 3 horizontal×3 vertical pixels or more and the size of the block includes either 2 horizontal×1 vertical pixels or more or 1 horizontal×2 vertical pixels or more.
(29) The video signal processing apparatus according to (27) or (28), in which
the second video signal processing unit is configured to segment the first video signal into one or more divided areas having a first size and a plurality of divided areas having a second size smaller than the first size.

(30) The video signal processing apparatus according to (29), in which
the second video signal processing unit is configured to arrange the one or more divided areas having the first size at a center portion of a video space according to the first video signal and arrange the plurality of divided areas having the second size at a periphery of the one or more divided areas having the first size.

(31) The video signal processing apparatus according to any of (27) to (30), in which
the second video signal processing unit is configured to set the individual block at such a position that the individual block is present over the plurality of divided areas.

(32) The video signal processing apparatus according to any of (27) to (31), in which
the second video signal processing unit further includes
a downconverter that generates a third video signal having the second resolution from the first video signal by downconversion, and
a switching unit that switches between the second video signal and the third video signal.

(33) The video signal processing apparatus according to any of (27) to (32), in which the second video signal processing unit further includes a detail processing unit that performs processing of emphasizing a contour of the second video signal by skipping a joint between the blocks.

(34) A video signal processing method, including:
generating, by a first video signal processing unit, a first video signal having a first resolution from a pixel signal obtained by an image pickup apparatus; and
setting, by a second video signal processing unit, a plurality of divided areas for spatially segmenting the first video signal, cutting out the first video signal in a region smaller than a size of the corresponding divided area as a block from the first video signal in each of the individual divided areas, and connecting the blocks to one another to thereby generate a second video signal having a second resolution lower than the first resolution.

(35) The video signal processing method according to (34), in which
the size of the divided area includes 3 horizontal×3 vertical pixels or more and the size of the block includes either 2 horizontal×1 vertical pixels or more or 1 horizontal×2 vertical pixels or more.

(36) The video signal processing method according to (34) or (35), in which
the second video signal processing unit segments the first video signal into one or more divided areas having a first size and a plurality of divided areas having a second size smaller than the first size.

(37) The video signal processing method according to (36), in which
the second video signal processing unit arranges the one or more divided areas having the first size at a center portion of a video space according to the first video signal and arranges the plurality of divided areas having the second size at a periphery of the one or more divided areas having the first size.

(38) The video signal processing method according to any of (34) to (37), in which
the second video signal processing unit sets the individual block at such a position that the individual block is present over the plurality of divided areas.

(39) The video signal processing method according to any of (34) to (38), in which the second video signal processing unit generates a third video signal having the second resolution from the first video signal by downconversion, and
switches between the second video signal and the third video signal and outputs the second video signal or the third video signal.

(40) The video signal processing method according to any of (34) to (39), in which
the second video signal processing unit performs processing of emphasizing a contour of the second video signal by skipping a joint between the blocks.

REFERENCE SIGNS LIST

1 image pickup apparatus
11 optical block
12 image pickup unit
13 main-line video signal processing unit
14 transmission unit
15 VF signal processing unit
16 VF
17 control unit
18 operation input unit
151 downconverter
152 block connecting unit
153 switching unit
154 detail processing unit

The invention claimed is:
1. An image pickup apparatus, comprising:
an image pickup unit including an image pickup element;
a first video signal processing unit configured to generate a first video signal having a first resolution from a pixel signal obtained by the image pickup unit;
a second video signal processing unit configured to:
set a plurality of divided areas for spatially segmenting at least part of the first video signal generated by the first video signal processing unit,
cut out the first video signal in a region smaller than a size of the corresponding divided area as a block from the first video signal in each of the plurality of divided areas, and
connect individual divided areas to one another to thereby generate a second video signal having a second resolution lower than the first resolution; and
a view finder configured to display the second video signal.

2. The image pickup apparatus according to claim 1, wherein
the size of the divided area includes 3 horizontal×3 vertical pixels or more and the size of the block includes either 2 horizontal×1 vertical pixels or more or 1 horizontal×2 vertical pixels or more.

3. The image pickup apparatus according to claim 2, wherein
the second video signal processing unit is configured to segment the first video signal into one or more divided areas having a first size and a plurality of divided areas having a second size smaller than the first size.

4. The image pickup apparatus according to claim 3, wherein
the second video signal processing unit is configured to arrange the one or more divided areas having the first size at a center portion of a video space according to the first video signal and arrange the plurality of divided areas having the second size at a periphery of the one or more divided areas having the first size.

5. The image pickup apparatus according to claim 4, wherein
the second video signal processing unit is configured to set the block is present over the plurality of divided areas.

6. The image pickup apparatus according to claim 1, wherein
the second video signal processing unit further includes:
a downconverter configured to generate a third video signal having the second resolution from the first video signal by downconversion, and
a switching unit configured to switch between the second video signal and the third video signal.

7. The image pickup apparatus according to claim 1, wherein
the second video signal processing unit further includes a detail processing unit configured to perform processing of emphasizing a contour of the second video signal by skipping a joint between the blocks.

8. The image pickup apparatus according to claim 1, further comprising
an output unit configured to output the second video signal generated by the second video signal processing unit to an external apparatus.

9. The image pickup apparatus according to claim 1, further comprising
an operation input unit including at least one operation element configured to receive an operation by a user, and
a control unit configured to detect a state of the at least one operation element at a time of image pickup and reflect setting information based on the operation to an operation of the second video signal processing unit in real time.

10. The image pickup apparatus according to claim 9, wherein
the setting information includes a number of divided areas.

11. The image pickup apparatus according to claim 9, wherein
the setting information includes a size of the block.

12. The image pickup apparatus according to claim 9, wherein
the setting information includes a position of the block.

13. The image pickup apparatus according to claim 9, wherein
the setting information includes on/off of segmenting the first video signal into the one or more divided areas having a first size and the plurality of divided areas having a second size.

14. An image pickup apparatus, comprising:
an image pickup unit including an image pickup element;
a first video signal processing unit configured to generate a first video signal having a first resolution from a pixel signal obtained by the image pickup unit;
a second video signal processing unit configured to:
generate a downconverted video by downconverting the first video signal in an outer edge portion,
set a plurality of divided areas for spatially segmenting the first video signal in a region inside the outer edge portion,
cut out the first video signal in a region smaller than a size of the corresponding divided area as a block from the first video signal in each of the plurality of divided areas,
connect the blocks to one another to thereby generate block-connected video, and
connect the downconverted video and the block-connected video to each other to thereby generate a second video signal having a second resolution lower than the first resolution; and
a view finder configured to display the second video signal.

15. A video signal processing apparatus, comprising:
a first video signal processing unit configured to generate a first video signal having a first resolution from a pixel signal obtained by an image pickup apparatus; and
a second video signal processing unit configured to:
set a plurality of divided areas for spatially segmenting the first video signal generated by the first video signal processing unit,
cut out the first video signal in a region smaller than a size of the corresponding divided area as a block from the first video signal in each of the plurality of divided areas, and
connect the blocks to one another to thereby generate a second video signal having a second resolution lower than the first resolution.

16. A video signal processing method, comprising:
generating, by a first video signal processing unit, a first video signal having a first resolution from a pixel signal obtained by an image pickup apparatus;
setting, by a second video signal processing unit, a plurality of divided areas for spatially segmenting the first video signal;
cutting out the first video signal in a region smaller than a size of the corresponding divided area as a block from the first video signal in each of the plurality of divided areas; and
connecting the blocks to one another to thereby generate a second video signal having a second resolution lower than the first resolution.

17. An image pickup apparatus, comprising:
an image pickup unit including an image pickup element;
a first video signal processing unit configured to generate a first video signal having a first resolution from a pixel signal obtained by the image pickup unit;
a second video signal processing unit configured to:
set a plurality of divided areas for spatially segmenting at least part of the first video signal generated by the first video signal processing unit,
cut out the first video signal in a region smaller than a size of the corresponding divided area as a block from the first video signal in each of the plurality of divided areas, and
connect the blocks to one another to thereby generate a second video signal having a second resolution lower than the first resolution; and
an output unit that outputs the second video signal.

* * * * *